(12) United States Patent
Siavoshy et al.

(10) Patent No.: US 11,914,687 B2
(45) Date of Patent: Feb. 27, 2024

(54) CONTROLLING ACCESS TO COMPUTER RESOURCES

(71) Applicant: Palantir Technologies Inc., Denver, CO (US)

(72) Inventors: Babak Siavoshy, Irvine, CA (US); Kyle Owens, San Francisco, CA (US); Nathaniel Edwards, Arlington, VA (US)

(73) Assignee: Palantir Technologies Inc., Denver, CO (US)

( * ) Notice: Subject to any disclaimer, the term of this patent is extended or adjusted under 35 U.S.C. 154(b) by 33 days.

(21) Appl. No.: 17/092,699

(22) Filed: Nov. 9, 2020

(65) Prior Publication Data

US 2021/0056185 A1 Feb. 25, 2021

Related U.S. Application Data

(63) Continuation of application No. 16/288,528, filed on Feb. 28, 2019, now Pat. No. 10,860,698, which is a (Continued)

(51) Int. Cl.
*H04L 29/06* (2006.01)
*G06F 21/31* (2013.01)
(Continued)

(52) U.S. Cl.
CPC .............. *G06F 21/31* (2013.01); *G06F 21/45* (2013.01); *G06F 21/62* (2013.01); (Continued)

(58) Field of Classification Search
CPC .................... G06F 21/31; G06F 2221/2141
See application file for complete search history.

(56) References Cited

U.S. PATENT DOCUMENTS 5,263,158 A * 11/1993 Janis ...................... G06F 9/468
5,978,475 A 11/1999 Schneier et al.
(Continued)

FOREIGN PATENT DOCUMENTS

CN 101729531 6/2010
CN 103281301 9/2013
(Continued)

OTHER PUBLICATIONS

U.S. Appl. No. 16/563,133, Charter-Based Access Controls for Managing Computer Resources.
(Continued)

*Primary Examiner* — Jason K Gee
(74) *Attorney, Agent, or Firm* — Knobbe, Martens, Olson & Bear, LLP

(57) ABSTRACT

A system is described for controlling access to resources using an object model. Users can specify use cases for accessing resources. The user may be granted access if the user satisfies qualifications required for accessing the resource, selected a use case permissible for accessing the resource, and satisfies qualifications required for the use case. Use cases, qualifications, resources, and/or links between them can be implemented using an object model. The system can be used in addition to authentication and authorization.

20 Claims, 9 Drawing Sheets

Related U.S. Application Data continuation of application No. 16/023,397, filed on Jun. 29, 2018, now Pat. No. 10,255,415.

(60) Provisional application No. 62/652,198, filed on Apr. 3, 2018.

(51) Int. Cl.
*H04L 9/40* (2022.01)
*G06F 21/62* (2013.01)
*G06F 21/45* (2013.01)

(52) U.S. Cl.
CPC ........ *G06F 21/6209* (2013.01); *H04L 63/102* (2013.01); *H04L 63/104* (2013.01)

(56) References Cited

U.S. PATENT DOCUMENTS

| | | | |
|---|---|---|---|
| 6,029,195 | A | 2/2000 | Herz |
| 6,202,066 | B1* | 3/2001 | Barkley ............. G06F 21/6218 707/999.009 |
| 6,292,798 | B1 | 9/2001 | Dockter et al. |
| 6,487,665 | B1 | 11/2002 | Andrews et al. |
| 6,725,240 | B1 | 4/2004 | Asad et al. |
| 6,735,701 | B1 | 5/2004 | Jacobson |
| 6,807,569 | B1 | 10/2004 | Bhimani et al. |
| 7,017,046 | B2 | 3/2006 | Doyle et al. |
| 7,069,586 | B1 | 6/2006 | Winneg et al. |
| 7,225,468 | B2 | 5/2007 | Waisman et al. |
| 7,249,374 | B1 | 7/2007 | Lear et al. |
| 7,596,285 | B2 | 9/2009 | Brown et al. |
| 7,770,032 | B2 | 8/2010 | Nesta et al. |
| 7,801,871 | B2 | 9/2010 | Gosnell |
| 7,962,495 | B2 | 6/2011 | Jain et al. |
| 8,181,253 | B1 | 5/2012 | Zaitsev et al. |
| 8,190,893 | B2 | 5/2012 | Benson et al. |
| 8,196,184 | B2 | 6/2012 | Amirov et al. |
| 8,239,668 | B1 | 8/2012 | Chen et al. |
| 8,301,904 | B1 | 10/2012 | Gryaznov |
| 8,312,546 | B2 | 11/2012 | Alme |
| 8,429,708 | B1 | 4/2013 | Tandon |
| 8,646,080 | B2 | 2/2014 | Williamson et al. |
| 8,683,322 | B1 | 3/2014 | Cooper |
| 8,726,379 | B1 | 5/2014 | Stiansen et al. |
| 8,769,412 | B2 | 7/2014 | Gill et al. |
| 8,782,794 | B2 | 7/2014 | Ramcharran |
| 8,793,489 | B2 | 7/2014 | Polunin et al. |
| 8,931,043 | B2 | 1/2015 | Cooper et al. |
| 9,021,260 | B1 | 4/2015 | Falk et al. |
| 9,049,117 | B1 | 6/2015 | Nucci et al. |
| 9,100,428 | B1 | 8/2015 | Visbal |
| 9,335,897 | B2 | 5/2016 | Goldenberg |
| 9,338,013 | B2 | 5/2016 | Castellucci et al. |
| 9,582,780 | B1 | 2/2017 | Curcic et al. |
| 9,888,039 | B2 | 2/2018 | Elliot et al. |
| 10,255,415 | B1 | 4/2019 | Siavoshy et al. |
| 10,476,965 | B1 | 11/2019 | Gray |
| 10,860,698 | B2 | 12/2020 | Siavoshy et al. |
| 11,107,022 | B2 | 8/2021 | Dhandapani et al. |
| 11,704,441 | B2 | 7/2023 | Yu et al. |
| 2002/0112157 | A1 | 8/2002 | Doyle et al. |
| 2002/0116642 | A1* | 8/2002 | Joshi ................. G06F 21/62 707/E17.112 |
| 2003/0018786 | A1 | 1/2003 | Lortz |
| 2003/0046576 | A1 | 3/2003 | High et al. |
| 2003/0088520 | A1* | 5/2003 | Bohrer ................. G06Q 10/10 705/74 |
| 2003/0167269 | A1 | 9/2003 | Gupta |
| 2004/0010607 | A1 | 1/2004 | Lee et al. |
| 2004/0064724 | A1 | 4/2004 | Himmel et al. |
| 2004/0098594 | A1 | 5/2004 | Fleming et al. |
| 2004/0123139 | A1 | 6/2004 | Aiello et al. |
| 2004/0153418 | A1 | 8/2004 | Hanweck |
| 2004/0250124 | A1 | 12/2004 | Chesla et al. |
| 2005/0157662 | A1 | 7/2005 | Bingham et al. |
| 2005/0229256 | A2 | 10/2005 | Banzhof |
| 2005/0262549 | A1* | 11/2005 | Ritt ................. H04L 63/083 726/1 |
| 2005/0262556 | A1 | 11/2005 | Waisman et al. |
| 2005/0275638 | A1 | 12/2005 | Kolmykov-Zotov et al. |
| 2006/0031928 | A1 | 2/2006 | Conley et al. |
| 2006/0069912 | A1 | 3/2006 | Zheng et al. |
| 2006/0212931 | A1 | 9/2006 | Shull et al. |
| 2006/0218394 | A1 | 9/2006 | Yang |
| 2006/0218637 | A1 | 9/2006 | Thomas et al. |
| 2006/0236380 | A1 | 10/2006 | Bransom et al. |
| 2006/0265747 | A1 | 11/2006 | Judge |
| 2006/0294580 | A1 | 12/2006 | Yeh, Jr. |
| 2007/0143851 | A1 | 6/2007 | Nicodemus |
| 2007/0214497 | A1 | 9/2007 | Montgomery et al. |
| 2007/0220479 | A1 | 9/2007 | Hughes |
| 2007/0233685 | A1 | 10/2007 | Burns et al. |
| 2007/0245409 | A1 | 10/2007 | Harris et al. |
| 2007/0271157 | A1 | 11/2007 | Rosenberg |
| 2007/0294766 | A1 | 12/2007 | Mir et al. |
| 2008/0104407 | A1 | 5/2008 | Horne et al. |
| 2008/0201580 | A1 | 8/2008 | Savitzky et al. |
| 2008/0222706 | A1 | 9/2008 | Renaud et al. |
| 2008/0229422 | A1 | 9/2008 | Hudis et al. |
| 2009/0103442 | A1 | 4/2009 | Douville |
| 2009/0119392 | A1 | 5/2009 | Bonjour et al. |
| 2009/0228701 | A1 | 9/2009 | Lin |
| 2009/0319529 | A1 | 12/2009 | Bartlett et al. |
| 2009/0328222 | A1 | 12/2009 | Helman et al. |
| 2010/0077481 | A1 | 3/2010 | Polyakov et al. |
| 2010/0100963 | A1 | 4/2010 | Mahaffey |
| 2010/0125612 | A1 | 5/2010 | Amradkar et al. |
| 2010/0235915 | A1 | 9/2010 | Memon et al. |
| 2010/0262688 | A1 | 10/2010 | Hussain et al. |
| 2010/0330801 | A1 | 12/2010 | Rouh |
| 2011/0060910 | A1 | 3/2011 | Gormish et al. |
| 2011/0202555 | A1 | 8/2011 | Cordover et al. |
| 2011/0219450 | A1 | 9/2011 | McDougal et al. |
| 2011/0251906 | A1 | 10/2011 | Loevenguth et al. |
| 2012/0079592 | A1 | 3/2012 | Pandrangi |
| 2012/0084866 | A1 | 4/2012 | Stolfo |
| 2012/0110674 | A1 | 5/2012 | Belani et al. |
| 2012/0169593 | A1 | 7/2012 | Mak et al. |
| 2012/0218305 | A1 | 8/2012 | Patterson et al. |
| 2012/0254129 | A1 | 10/2012 | Wheeler et al. |
| 2012/0278901 | A1* | 11/2012 | Bunter ................. G07C 9/38 726/28 |
| 2012/0284791 | A1 | 11/2012 | Miller et al. |
| 2012/0330801 | A1 | 12/2012 | McDougal et al. |
| 2013/0019306 | A1 | 1/2013 | Lagar-Cavilla et al. |
| 2013/0097709 | A1 | 4/2013 | Basavapatna et al. |
| 2013/0132854 | A1* | 5/2013 | Raleigh ................. G06F 3/0482 715/738 |
| 2013/0139268 | A1 | 5/2013 | An et al. |
| 2013/0191339 | A1 | 7/2013 | Haden et al. |
| 2013/0239217 | A1 | 9/2013 | Kindler et al. |
| 2013/0295975 | A1 | 11/2013 | Johnson et al. |
| 2014/0032759 | A1 | 1/2014 | Barton et al. |
| 2014/0040979 | A1 | 2/2014 | Barton et al. |
| 2014/0059683 | A1 | 2/2014 | Ashley |
| 2014/0075492 | A1 | 3/2014 | Kapadia et al. |
| 2014/0090026 | A1 | 3/2014 | Mishra et al. |
| 2014/0123279 | A1 | 5/2014 | Bishop et al. |
| 2014/0143009 | A1 | 5/2014 | Brice et al. |
| 2014/0173712 | A1 | 6/2014 | Ferdinand |
| 2014/0173738 | A1 | 6/2014 | Condry et al. |
| 2014/0188895 | A1 | 7/2014 | Wang et al. |
| 2014/0214468 | A1 | 7/2014 | Wurtele et al. |
| 2014/0229422 | A1 | 8/2014 | Jain et al. |
| 2014/0366132 | A1 | 12/2014 | Stiansen et al. |
| 2015/0026208 | A1 | 1/2015 | Kuhmuench |
| 2015/0039565 | A1 | 2/2015 | Lucas |
| 2015/0128274 | A1 | 5/2015 | Giokas |
| 2015/0188715 | A1 | 7/2015 | Castelluci et al. |
| 2015/0229664 | A1 | 8/2015 | Hawthorn et al. |
| 2015/0248563 | A1 | 9/2015 | Alfarano et al. |
| 2015/0248651 | A1 | 9/2015 | Akutagawa et al. |
| 2015/0261847 | A1 | 9/2015 | Ducott et al. |
| 2015/0326601 | A1 | 11/2015 | Grondin et al. |

(56) References Cited

U.S. PATENT DOCUMENTS

| | | | |
|---|---|---|---|
| 2016/0004864 | A1 | 1/2016 | Falk et al. |
| 2016/0028759 | A1 | 1/2016 | Visbal |
| 2016/0044132 | A1 | 2/2016 | Croft |
| 2016/0112397 | A1 | 4/2016 | Mankovskii |
| 2016/0255087 | A1 | 9/2016 | Smith |
| 2016/0283406 | A1 | 9/2016 | Linga et al. |
| 2017/0359379 | A1 | 12/2017 | Elliot et al. |
| 2018/0077542 | A1 | 3/2018 | Xie et al. |
| 2018/0375791 | A1 | 12/2018 | Kaladgi et al. |
| 2020/0007455 | A1 | 1/2020 | Chhabra et al. |
| 2020/0145424 | A1 | 5/2020 | Chen |
| 2021/0064769 | A1 | 3/2021 | Yu et al. |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188069 | 7/2017 |
| EP | 3550791 | 10/2019 |
| EP | 3789899 | 3/2021 |
| NL | 2011642 | 8/2015 |
| WO | WO 2005/010685 | 2/2005 |
| WO | WO 2016/123359 | 8/2016 |

OTHER PUBLICATIONS

Official Communication for European Patent Application No. 20193929.5 dated Dec. 11, 2020, 9 pages.
Official Communication for European Patent Application No. 18180766.0 dated Oct. 28, 2021, 6 pages.
Alagar et al., "Uniform Service Description and Contextual Access Control for Trustworthy Cloud Computing," 2018 International Conference on Cloud Computing, Big Data and Blockchain (ICCBB), 2018, pp. 1-7.
Filho et al., "A Generalized Context-Based Access Control Model for Pervasive Environments," Proceedings of the 2nd Sigspatial ACM GIS 2009 International Workshop on Security and Privacy in GIS and LBS. 2009, pp. 12-21.
He et al., "Role Security Access Control of the Distributed Object Systems," 2014 11th International Computer Conference on Wavelet Actiev Media Technology and Information Processing (ICCWAMTIP), 2014, pp. 389-392.
Official Communication for European Patent Application No. 18180766.0 dated Jun. 30, 2022, 5 pages.
Official Communication for European Patent Application No. 18180766.0 dated Jan. 3, 2023, 5 pages.
Baker et al., "The Development of a Common Enumeration of Vulnerabilities and Exposures," Presented at the Second International Workshop on Recent Advances in Intrusion Detection, Sep. 7-9, 1999, pp. 35.
Bhuyan et al., "Network Anomaly Detection: Methods, Systems and Tools," First Quarter 2014, IEEE, 34 pages.
Crosby et al., "Efficient Data Structures for Tamper-Evident Logging," Department of Computer Science, Rice University, 2009, pp. 17.
FireEye—Products and Solutions Overview, <http://www.fireeye.com/products-and-solutions> Printed Jun. 30, 2014 in 3 pages.
Fireeye, <http://www.fireeye.com/> Printed Jun. 30, 2014 in 2 pages.
Glaab et al., "EnrichNet: Network-Based Gene Set Enrichment Analysis," Bioinformatics 28.18 (2012): pp. 1451-i457.
Hur et al., "SciMiner: web-based literature mining tool for target identification and functional enrichment analysis," Bioinformatics 25.6 (2009): pp. 838-840.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Virus Total—About, <http://www.virustotal.com/en/about/> Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Screenshot of USPTO log-in and authentication pages, retrieved on Sep. 24, 2018, in 3 pages.
Official Communication for European Patent Application No. 18180766.0 dated Oct. 8, 2018, 7 pages.
U.S. Pat. No. 10,255,415, Controlling Access to Computer Resources, Apr. 9, 2019.
U.S. Pat. No. 10,860,698, Controlling Access to Computer Resources, Dec. 8, 2020.
U.S. Pat. No. 11,704,441, Charter-Based Access Controls for Managing Computer Resources, Jul. 18, 2023.
U.S. Appl. No. 18/325,813, Charter-Based Access Controls for Managing Computer Resources, May 30, 2023.

\* cited by examiner

CONTROLLING ACCESS TO COMPUTER RESOURCES

REFERENCE TO PRIORITY APPLICATIONS

This application is a continuation of U.S. patent application Ser. No. 16/288,528 filed Feb. 28, 2019 and titled "CONTROLLING ACCESS TO COMPUTER RESOURCES," which is a continuation of U.S. patent application Ser. No. 16/023,397 filed Jun. 29, 2018 and titled "CONTROLLING ACCESS TO COMPUTER RESOURCES," which claims the benefit of U.S. Provisional Patent Application No. 62/652,198 filed Apr. 3, 2018 and titled "QUALIFICATIONS AND USE CASES FOR MANAGING AND AUDITING ACCESS TO COMPUTER RESOURCES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to controlling access to computer resources. More specifically, the present disclosure includes controlling access, for example by managing and auditing access to computer resources using qualifications and use cases.

BACKGROUND

A background is provided for introductory purposes and to aid the reader in understanding the detailed description. The background should not be taken as an admission of any prior art to the claims.

Some computer systems limit access to computer resources by requiring authentication credentials, such as a username and password. Some computer systems also impose authorization restrictions that specify which user or groups of users can read, write, or modify a resource.

However, these computer systems can be insufficient for protecting and auditing access to computer resources. Furthermore, the use of authentication credentials and authorization restrictions, without more, can be inefficient and take large amounts of time, data and memory to administer, especially when making large scale changes. Authentication credentials and authorization restrictions may also be insufficient for protecting private or confidential computer resources.

SUMMARY

Some aspects feature a computer system comprising: one or more computer readable storage devices and one or more processors. The one or more computer readable storage devices are configured to store: a first qualification object specifying a first qualification; a first use case object indicating a first purpose, the first use case object being associated with the first qualification object; a first resource object representing a first computer resource, the first resource object linked with at least the first use case object; a first user object representing the first user, the first user object indicating one or more qualifications of the first user; and a plurality of computer readable instructions. The one or more processors are configured to execute the plurality of computer readable instructions to cause the computer system to perform operations comprising: receiving an authentication credential provided by the first user; authenticating the first user based at least in part on the authentication credential; receiving, from the first user, an indication of the first use case; determining that the qualifications of the first user satisfy the first qualification of the first qualifications object that is associated with the first use case object; and based at least in part on the determining, providing the first user with access to the first computer resource.

Various embodiments of the computer system can include, one, all, or any combination of features of this paragraph. The first computer resource can be one of: a file, a folder, a database, a memory, a processor, a drive, a storage device, a computer, a laptop, or a phone; the authentication credential includes a username and password. The one or more processors can be configured to execute the plurality of computer readable instructions to cause the computer system to perform operations further comprising: determining that the first user has at least one of a read authorization, write authorization, or modify authorization for the first computer resource, and wherein the first user is provided the access to the first computer resource based at least in part on the determination that the first user has at least one of the read authorization, the write authorization, or the modify authorization for the first resource. The one or more processors are configured to execute the plurality of computer readable instructions to cause the computer system to perform operations further comprising: logging, in an audit log on the one or more computer readable storages, an entry for an access of the first resource by the first user, wherein the entry includes at least 2 of: a time stamp for the access; an identity of the first user; an identity of the first resource; the first use case; the qualifications of the first user; and qualifications required for accessing the first resource, the qualifications including the first qualification. The one or more processors can be configured to execute the plurality of computer readable instructions to cause the computer system to perform operations further comprising: receive log filter criteria; filter the audit log according to the log filter criteria; and generate a report based on the audit log and the log filter criteria, the report including at least one visualization of data in the audit log. The one or more computer readable storage devices can be further configured to store: a second use case object indicating a second purpose, wherein the first user object is not linked to the second use case object; and a second resource object representing a second computer resource, the second resource object linked with at least the second use case object. The one or more processors can be configured to execute the plurality of computer readable instructions to cause the computer system to perform operations further comprising: determining that the first user object is not linked to the second use case object; and denying access to the second computer resource based at least in part on the determination that the first user has object is not linked to the second use case object. The one or more computer readable storage devices can be further configured to store: a second use case object indicating a second purpose, wherein the first user object is linked to the second use case object; and a second qualification object specifying a second qualification, wherein the second qualification object linked to the second use object, and wherein the qualifications do not include the second qualification; and a second resource object representing a second computer resource, the second resource object linked with at least the second use case object. The one or more processors can be configured to execute the plurality of computer readable instructions to cause the computer system to perform operations further comprising: determining that the qualifications do not include the second qualification; and denying access to the second computer resource based at least in part on the determination that the qualifications do not include the second qualification. The one or more computer readable storage devices can be further configured to store: a second qualification object specifying a second qualification, wherein the first user object is not linked to the second qualification object; and a second resource object representing a second computer resource, the second resource object linked with at least the second qualification object. The one or more processors can be configured to execute the plurality of computer readable instructions to cause the computer system to perform operations further comprising: determining that the qualifications of the first user do not satisfy the second qualification; and denying access to the second computer resource based at least in part on the determination that the qualifications of the first user do not satisfy the second qualification. The one or more processors can be configured to execute the plurality of computer readable instructions to cause the computer system to perform operations further comprising: transmitting data indicating how to obtain the second qualification. The one or more processors can be configured to execute the plurality of computer readable instructions to cause the computer system to perform operations further comprising: receiving an indication that the first user obtained the second qualification; and creating a link between the first user object and the second qualification object to indicate that the qualifications of the first user satisfy the second qualification. The one or more processors can be configured to execute the plurality of computer readable instructions to cause the computer system to perform operations further comprising: receiving a selection, from the first user, of a second use case; and based at least in part on receiving the selection of the second use case from the first user, revoking the access to the first computer resource. The one or more processors can be configured to execute the plurality of computer readable instructions to cause the computer system to perform operations further comprising: receiving a selection, from the first user, of a second use case object, wherein the first resource object is linked with the second use case object; and determining that the qualifications satisfy second qualifications of a second qualification object linked to the second use case object; and based at least in part on the determination that the qualifications satisfy the second qualifications of the second qualification object linked to the second use case object, providing the first user with access to the first computer resource. The one or more processors can be configured to execute the plurality of computer readable instructions to cause the computer system to perform operations further comprising: receiving a selection, from the first user, of a second use case object, wherein the first resource object is linked with the second use case object; and determining that the qualifications do not satisfy second qualifications of a second qualification object linked to the second use case object; and based at least in part on the determination that the qualifications do not satisfy the second qualifications of the second qualification object linked to the second use case object, revoking, from the first user, the access to the first computer resource. The one or more processors are configured to execute the plurality of computer readable instructions to cause the computer system to perform operations further comprising: based on inputs received from an administrator, changing at least one link between two of: a user object, resource object, qualification object, or a use case object. In some embodiments a tag object is linked to the first resource object; a second qualification object is linked to the tag object, wherein the second qualifications object specifies a second qualification; and the qualifications of the first user satisfy the second qualification of the second qualifications object that is linked to the tag object. A tag object is linked to the first use case object; a second qualification object linked to the tag object, wherein the second qualifications object specifies a second qualification; and the qualifications of the first user satisfy the second qualification of the second qualifications object that is linked to the tag object. The one or more processors can be configured to execute the plurality of computer readable instructions to cause the computer system to perform operations further comprising: based on inputs received from an administrator, linking a second qualification object to a tag object; and determining user accesses to resources represented by resource objects that are linked to the tag object based at least in part on qualifications specified by the second qualification object. The one or more processors can be configured to execute the plurality of computer readable instructions to cause the computer system to perform operations further comprising: based on inputs received from an administrator, linking a second qualification object to a tag object, wherein the tag object is linked to the first use case object; and determining that the qualifications of the first user satisfy second qualification specified by the second qualifications object that is associated with the first use case object; and wherein the first user is provided the access to the first computer resource based at least in part on the determination that the qualifications of the first user satisfy the second qualifications.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
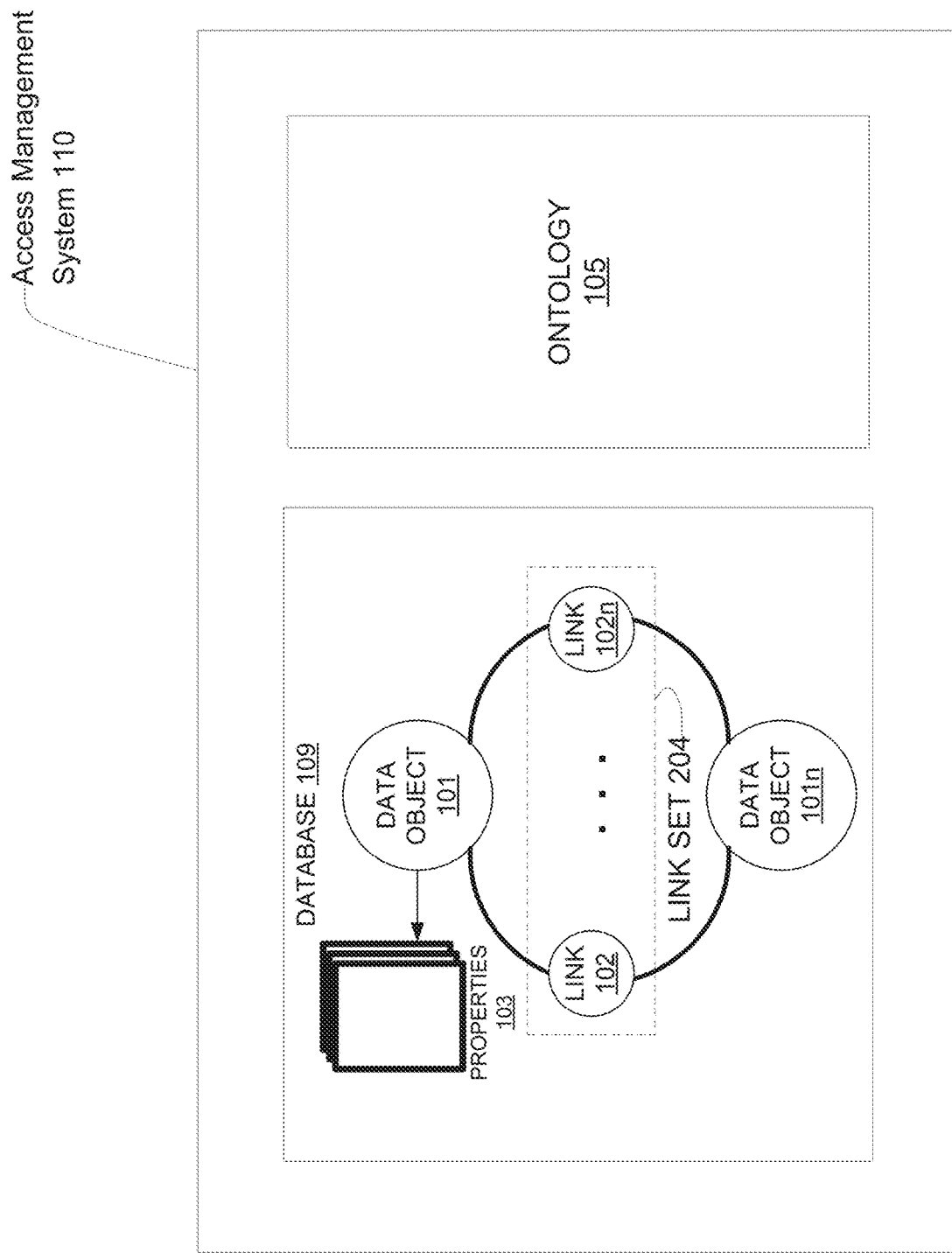
FIG. 1 shows an object-centric conceptual data model according to an embodiment.

Access to computer resources is managed by assigning authentication credentials (e.g., usernames and passwords) to users. Computer administrators may further impose authorization restrictions specifying which users or groups of users can read, write, or modify a resource. There may not be easy methods of propagating large scale changes to the restrictions—to change these, an administrator may have to manually change each permission of each resource. It is difficult to track or report why users are accessing authorized resources. It is also difficult to track or ensure that users are qualified to access authorized resources.

A system can be used to manage access to computer resources. To access a computer resource, a user may provide authentication credentials. If the user is authenticated, then an access management service can determine which resources the user is authorized to access. The user can be prompted to select a use case. Then, based on the selected use case, the access management service can determine which of the authorized resources the user may access for the selected use case. Additionally, the access management service can determine whether the user has sufficient qualifications to access the authorized resources. The qualification requirements can be determined based on the resource being access and/or based on the use case. An auditing service can log, on a data storage device, each resource access along with a time, authentication, authorization, use case, and qualification. Unlike systems that implement only authentication and authorization, the systems described herein can log why authenticated and authorized users access resources, ensure that users are qualified to access the resources for a selected use case, and log the qualifications of the users.

The access management system can use objects to represent resources, authorizations, authentications, use cases, users, and qualifications. Tags can also be implemented as objects and linked to use cases and/or resources. By using the object model, administrators can more easily make and propagate large scale changes to the system as compared to, for example, individual editing of user's permissions or tracking access in spreadsheets.

A computer system or software framework is provided for purpose-based data permissioning within an organization. The system data permissioning is based on a user's selected use case, in additional to authentication and authorization. An organization may establish use cases associated with access to resources (a dataset, folder, RSA token, client badge, etc., or a physical item, such as a laptop or room).

A use case describes the relationship between users and resources, subject to certain qualifications. A qualification describes a condition that a user needs to meet (e.g., user signs policy x, or the user takes training y) as part of gaining access to a use case or resources/data. Qualifications are distinct from one another, and each may be associated with multiple use cases. Further, because each qualification is distinct and canonical, individual qualifications may be easily updated at a single location (e.g., a training is updated and the applicable qualification can be linked to the updated training).

Resources, use cases, qualifications, and users can all be implemented as data objects in the system, are each associated with various properties, and may be linked to one another. For example, a use case data object may be linked to various qualification data objects associated with the use case data object. Whenever an authenticated and authorized user attempts to access a resource, the user can be prompted to specify a use case. Only users satisfying at least one qualification associated with a selected use case may access resources associated with the use case. Further, only resources associated with the selected use case can be accessed by the user. Additionally, whenever an authenticated and authorized user attempts to access a resource, it is determined whether the user has one or more qualifications required for accessing the resource, based on a selected use case.

The user (who may be associated with multiple use cases) can be authenticated and authorized. The user can identify a use case among the multiple use cases. The system can determine a set of qualifications associated with the selected use case and compare the selected use case's required qualifications to the user's qualifications. If at least one of the use case's qualifications is satisfied, then the user is granted access to the resources. If none of the use case's qualifications are satisfied, the user is not granted access to the resources but is optionally provided means to obtain the qualification (e.g., user is linked to a training resource, etc.).

The system tracks each user's resources accesses and logs the associated use cases and qualifications. The log can be used to generate reports for auditing. The system can also include update qualifications of users whenever users complete trainings or input additional qualifications. Tags that include any combinations of use cases and/or qualifications can be created and applied to resources. Tags including any combination of qualifications can be applied to use cases. The combinations do not need to be individually and repeatedly specified for each resource or use case, and group changes can be made by changing the tag.

Users may update various aspects of the system based on associated roles. For example, a user with an administrator role may be authorized to create and edit use cases, etc.; and a user with a manager role and associated with a use case may be authorized to add users to a use case, etc.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Computer Resource or Resource: Any data, hardware, or physical item. May include data and items that can be accessed by a user through a computer system. Non-limiting examples include files, folders, computing machines, memory, processors, servers, hard drives, databases, laptops, RSA tokens, client badges, etc.

Data Object or Object: A data container for information representing specific things that have a number of definable properties. For example, a data object can represent an entity such as a person, a place, an organization, a resource, a link, a qualification, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: A type of a data object (e.g., User, Resource, or Qualification). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Object Centric Data Model

To provide a framework for the following discussion of specific systems and methods described herein, an example access management system 110 using an ontology 105 will now be described. This description is provided for the purpose of providing an example and is not intended to limit the techniques to the example data model, the example database system, or the example database system's use of an ontology to represent information.

In some embodiments, a body of data is conceptually structured according to an object-centric data model represented by ontology 105. The conceptual data model is independent of any particular database used for durably storing one or more database(s) 109 based on the ontology 105. For example, each object of the conceptual data model may correspond to one or more rows in a relational database or an entry in Lightweight Directory Access Protocol (LDAP) database, or any combination of one or more databases.

FIG. 1 shows an object-centric conceptual data model according to an embodiment. An ontology 105, as noted above, may include stored information providing a data model for storage of data in the database 109. The ontology 105 may be defined by one or more object types, which may each be associated with one or more property types. At the highest level of description, data object 101 is a container for information representing things in the world. For example, data object 101 can represent an entity such as a person, a place, an organization, a resource, or other noun. Data object 101 can represent an event that happens at a point in time or for a duration. Data object 101 can represent a document or other unstructured data source such as an e-mail message, a news report, or a written paper or article. Each data object 101 is associated with a unique identifier that uniquely identifies the data object within the database system.

Different types of data objects may have different property types. For example, a "Person" data object might have an "Eye Color" property type and an "Event" data object might have a "Date" property type. Each property 103 as represented by data in the access management system 110 may have a property type defined by the ontology 105 used by the database 105.

Objects may be instantiated in the database 109 in accordance with the corresponding object definition for the particular object in the ontology 105. For example, a specific folder (e.g., an object of type "Resource") at "C:\Folder" (e.g., a property of type "directory") may be stored in the database 109 as an resource object with associated qualifications and use cases as defined within the ontology 105.

The data objects defined in the ontology 105 may support property multiplicity. In particular, a data object 101 may be allowed to have more than one property 103 of the same property type. For example, a "Person" data object might have multiple "Address" properties or multiple "Name" properties.

Each link 102 represents a connection between two data objects 101. In some embodiments, the connection can be through a relationship, an event, a property, or through matching properties. A relationship connection may be asymmetrical or symmetrical. For example, "Person" data object A may be connected to "Person" data object B by a "Boss Of" relationship (where "Person" data object B has an asymmetric "Boss Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Office" data object representing a particular business office if they worked at the same place, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing accountants at a finance firm, may both have a "CPA Qualified" property that indicates that both of them have CPA licenses. If both people work at the same office, then their "Business Address" properties likely contain similar, if not identical property values. In some embodiments, a link between two data objects may be established based on similar or matching properties (e.g., property types and/or property values) of the data objects. These are just some examples of the types of connections that may be represented by a link, and other types of connections may be represented; embodiments are not limited to any particular types of connections between data objects. For example, a document might contain references to two different objects. For example, a document may contain a reference to an event (one object), and a person (a second object). A link between these two objects may represent a connection between these two entities through their co-occurrence within the same document.

Each data object 101 can have multiple links with another data object 101 to form a link set. Each link 102 as represented by data in a database may have a link type defined by the database ontology used by the database.

Figure 2:
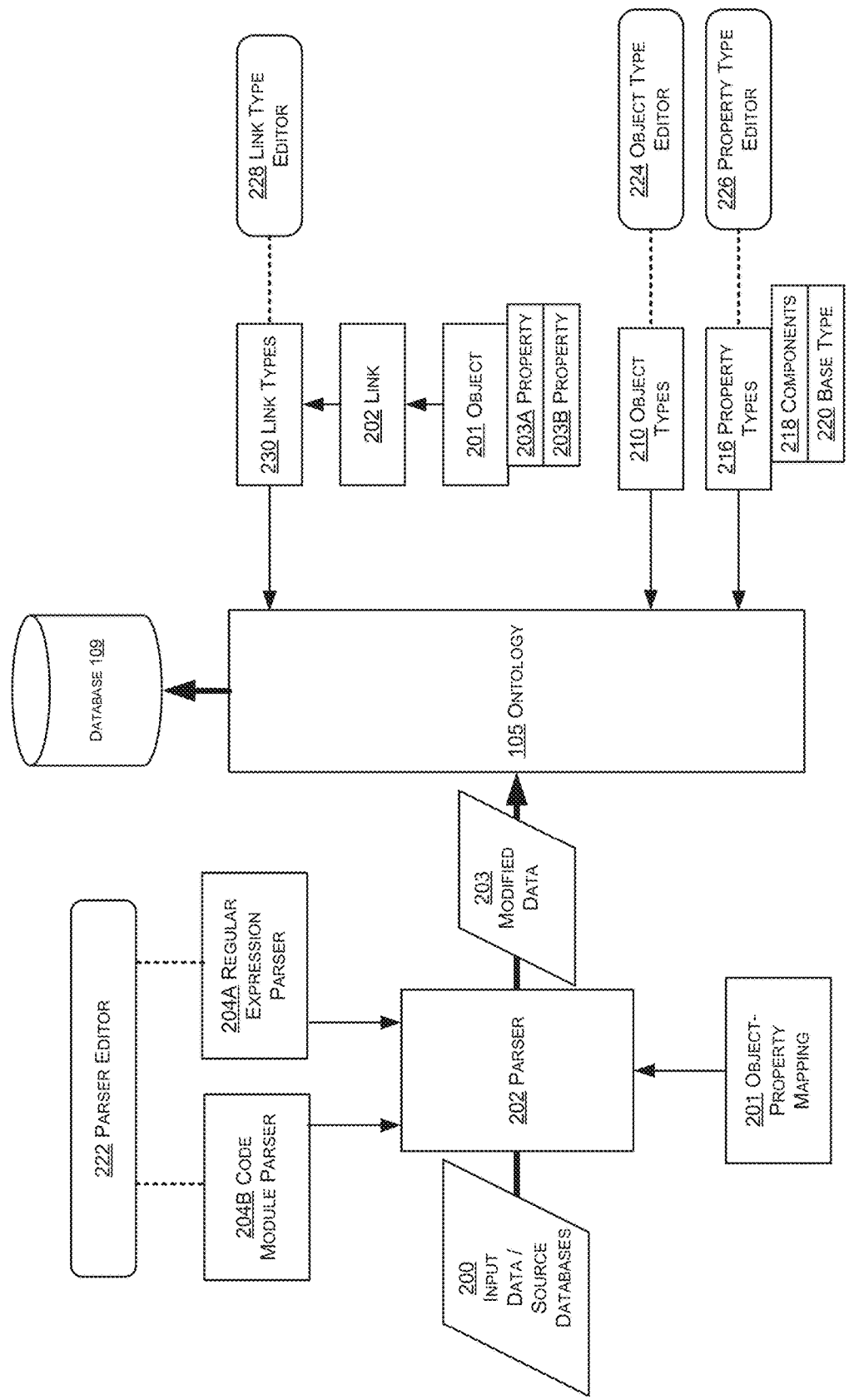
FIG. 2 shows a block diagram illustrating example components and data that may be used in identifying and storing data according to an ontology.

FIG. 2 shows a block diagram illustrating exemplary components and data that may be used in identifying and storing data according to an ontology. In this example, the ontology may be configured, and data in the data model populated, by a system of parsers and ontology configuration tools. In the embodiment of FIG. 2, input data 200 is provided to parser 202. The input data may comprise data from one or more sources. For example, a rental car institution may have one or more databases with information on calendar entries, rental cars, and people. The databases may contain a variety of related information and attributes about each type of data, such as a "date" for a calendar entries, an address for a person, and a date for when a rental car is rented. The parser 202 is able to read a variety of source input data types and determine which type of data it is reading.

In accordance with the discussion above, the example ontology 105 comprises stored information providing the data model of data stored in database 109, and the ontology is defined by one or more object types 210, one or more property types 216, and one or more link types 230. Based on information determined by the parser 202 or other mapping of source input information to object type, one or more data objects 101 may be instantiated in the database 109 based on respective determined object types 210, and each of the objects 101 has one or more properties 103 that are instantiated based on property types 216. Two data objects 101 may be connected by one or more links 102 that may be instantiated based on link types 230. The property types 216 each may comprise one or more data types 218, such as a string, number, etc. Property types 216 may be instantiated based on a base property type 220. For example, a base property type 220 may be "Locations" and a property type 216 may be "Home."

In some embodiments, an administrator of the system uses an object type editor 224 to create and/or modify the object types 210 and define attributes of the object types. In some embodiments, an administrator of the system uses a property type editor 226 to create and/or modify the property types 216 and define attributes of the property types. In some embodiments, an administrator of the system uses link type editor 228 to create the link types 230. Alternatively, other programs, processes, or programmatic controls may be used to create link types and property types and define attributes, and using editors is not required.

In some embodiments, creating a property type 216 using the property type editor 226 involves defining at least one parser definition using a parser editor 222. A parser definition comprises metadata that informs parser 202 how to parse input data 200 to determine whether values in the input data can be assigned to the property type 216 that is associated with the parser definition. In an embodiment, each parser definition may comprise a regular expression parser 204A or a code module parser 204B. In other embodiments, other kinds of parser definitions may be provided using scripts or other programmatic elements. Once defined, both a regular expression parser 204A and a code module parser 204B can provide input to parser 202 to control parsing of input data 200.

Using the data types defined in the ontology, input data 200 may be parsed by the parser 202 determine which object type 210 should receive data from a record created from the input data, and which property types 216 should be assigned to data from individual field values in the input data. Based on the object-property mapping 201, the parser 202 selects one of the parser definitions that is associated with a property type in the input data. The parser parses an input data field using the selected parser definition, resulting in creating new or modified data 203. The new or modified data 203 is added to the database 109 according to ontology 105 by storing values of the new or modified data in a property of the specified property type. As a result, input data 200 having varying format or syntax can be created in database 109. The ontology 105 may be modified at any time using object type editor 224, property type editor 226, and link type editor 228, or under program control without human use of an editor. Parser editor 222 enables creating multiple parser definitions that can successfully parse input data 200 having varying format or syntax and determine which property types should be used to transform input data 200 into new or modified input data 203.

Authentication

Figure 3:
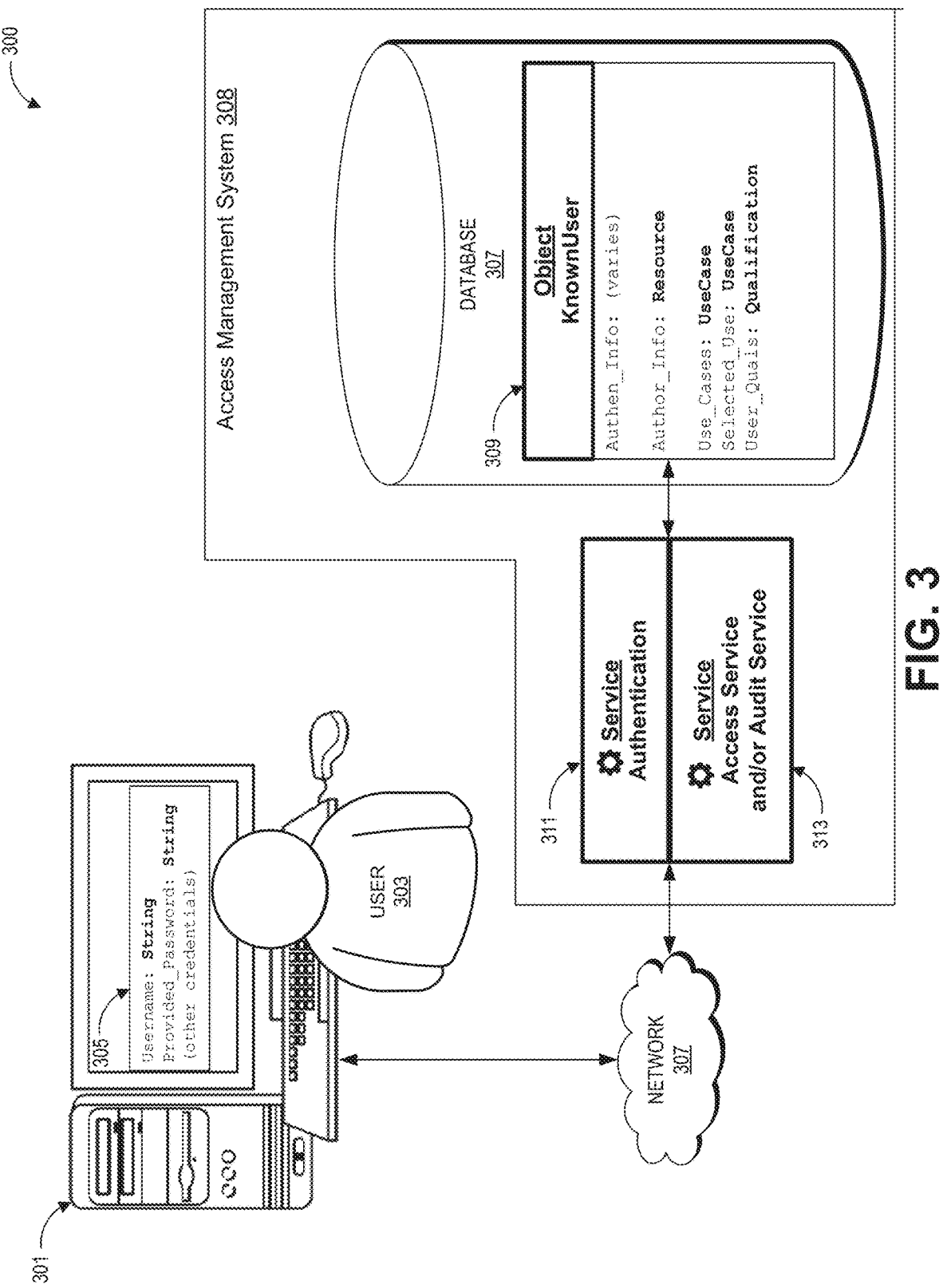
FIG. 3 shows an example block diagram including object models for authenticating a user.

FIG. 3 shows an example block diagram 300 including object models for authenticating a user. A user can be authenticated using authentication credentials, e.g., based on a username and password provided by the user. FIG. 3 shows a first computer system 301 being used by a user 303 to transmit authentication credentials 305 across a network 307. The access management system 308 receives the authentication credentials 305 authenticates the authentication credentials 305 against a database 307 of known user objects 309.

The user 303 may use a variety of different types of computer systems 301 to access various resources. The computer system 301 can include a desktop, laptop, terminal, smartphone, smartTV, etc. The user 303 may desire to access a variety of resources, such as files, folders, computing machines, memory, processors, servers, hard drives, databases, laptops, RSA tokens, client badges, etc., including time or job slots for using any of the aforementioned resources. Access to the resources can be restricted and audited as discussed herein.

The authentication credentials 305 provided by a user can include a username and password. In various embodiments, the authentication credentials 305 can include additional information, such as answers to challenge questions, hardware identifiers, passwords received through a second communication channel via N-factor authentication, time-based authentication data, etc. The authentication credentials 305 can be transmitted through a network 307 to the access management system 308 to authenticate the user 303.

The access management system 308 can use an authentication service 311 to compare the authentication credentials 305 against the authentication credentials of known user objects 309 in a database 307 and/or another database. An example flowchart for the authentication service 311 is discussed with respect to FIG. 4.

The access management system 308 can use an access and/or audit system to manage user access to various computer resources. Example flowcharts for access and/or audit services are described with respect to FIG. 6A and FIG. 6B.

Figure 5:
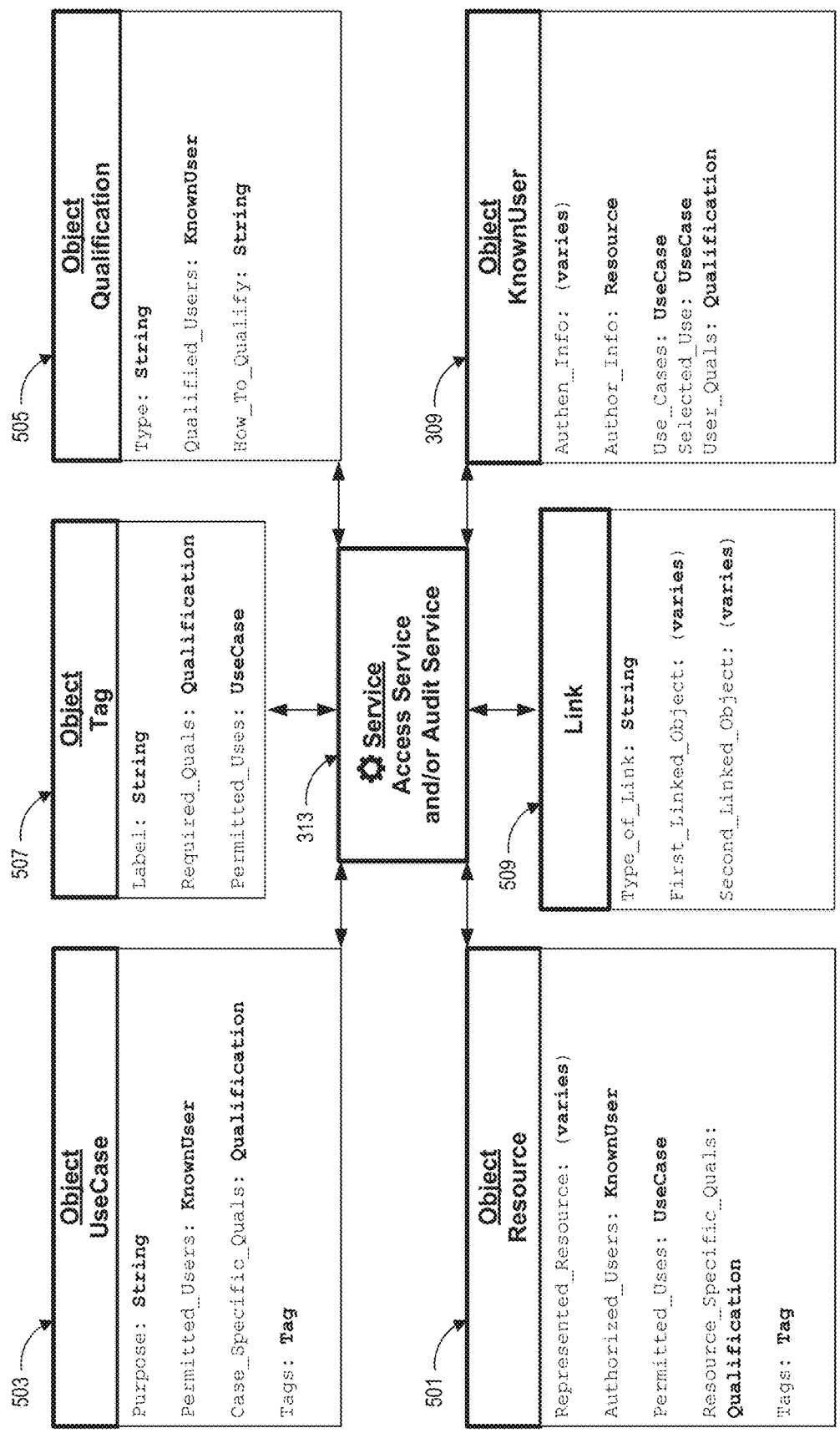
FIG. 5 shows an example block diagram including object models for managing access to resources using authorizations, use cases, and qualifications.
Figure 7:
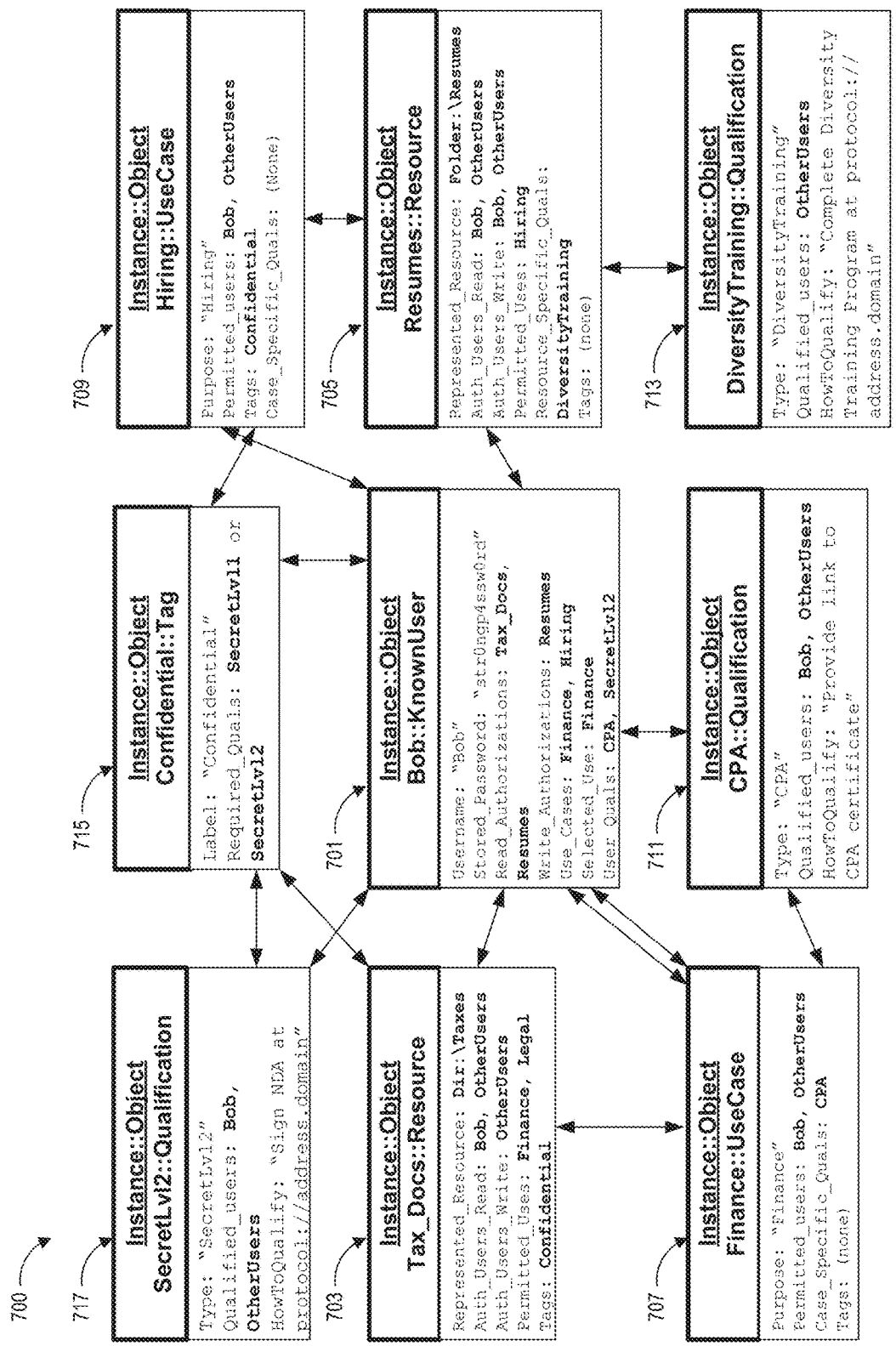
FIG. 7 shows example models for instances of objects related to an instance of a known user object.

The database 307 can include a plurality of objects 309 representing known users. The database 307 can additionally include a plurality of other objects, such as shown in FIG. 5 and FIG. 7.

The known user object 309 is represented with an object model. The known user object 309 has a plurality of properties. The known user object 309 can include a property such as "Authen_Info" to indicate information used for authentication credentials. The authentication credentials can include a username, an encrypted password, encryption scheme, etc. The authentication credentials can include string values, other object types, and/or references to other resources such as an encrypted database.

The known user object 309 can also include properties such as "Author_Info" to indicate linked resource objects that the known user has any type of authorization for. In some embodiments, the authorizations can specify resource objects that the known user is authorized to read from, write to, modify, and/or otherwise access. In some embodiments, the property indicating authorizations of the known user object 309 can be omitted, and authorizations can be handled at an operating system level or other level. Other properties can indicate linked use case objects that represent purposes for accessing resources, a link to a selected use case object, and linked qualification objects that indicate qualifications of the known user. Known user object 309 is further described with respect to FIG. 5, FIG. 6A, FIG. 6B, and FIG. 7. Although the object model includes example types/objects associated with each property, it will be understood that various embodiments can use different data types and/or types of objects for the properties. For example, the Authen_Info can be an object indicating authentication credentials, a String, a double, etc. As further explained with respect to FIG. 5, any of the properties of the known user object 309 can additionally or alternatively be indicated using links 509.

Figure 4:
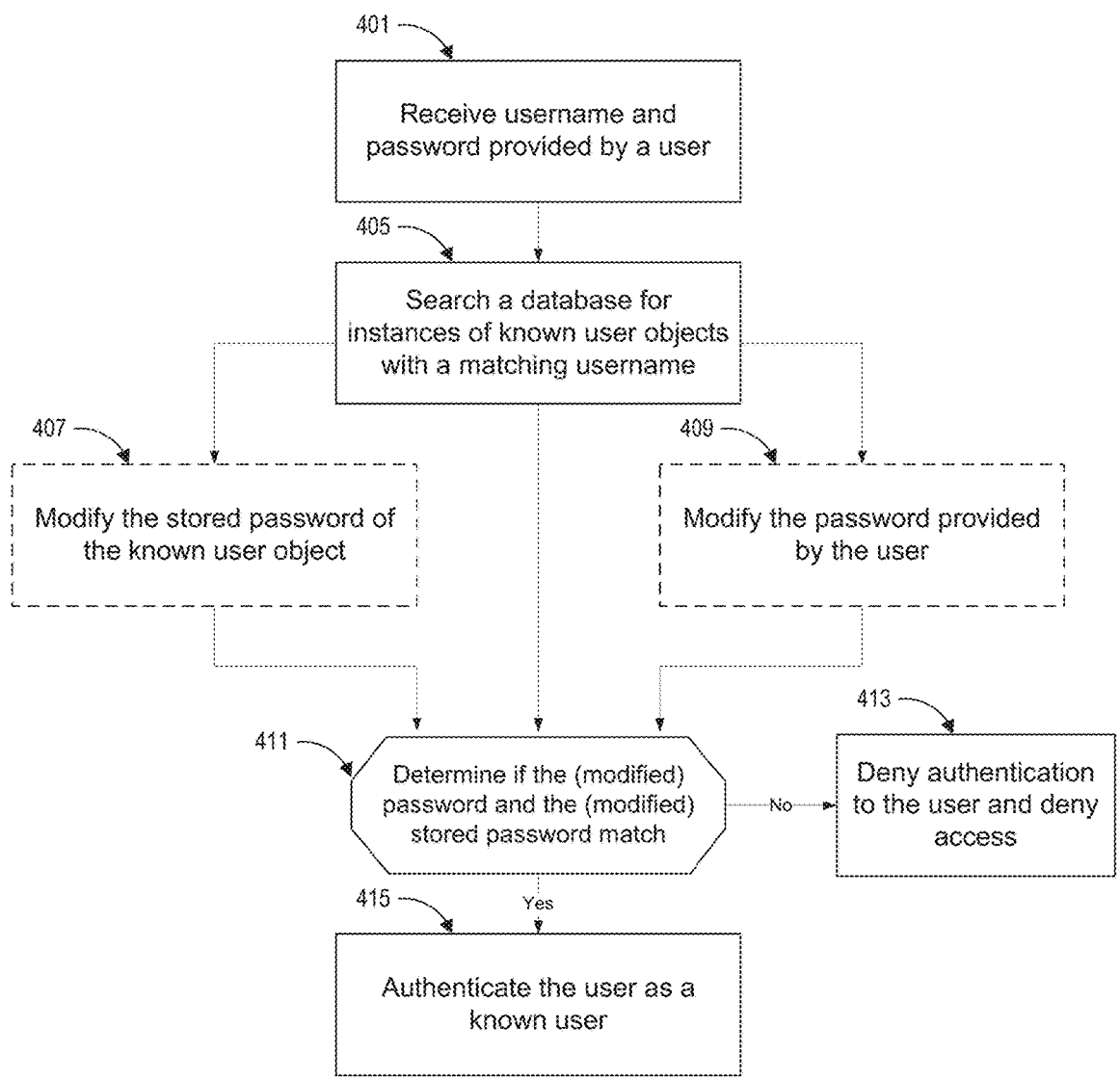
FIG. 4 shows a block diagram for an example authentication service.

FIG. 4 shows a block diagram for an example authentication service 311. At block 401, a username and password provided by a user can be received. In some embodiments, other authentication credentials can be received as well.

At block 405, a database (such as database 307 of FIG. 3) can be searched for instances of known user objects that match the username provided by the user. In some embodiments, the search can be performed by referencing an index. A matching known user object can be found. In some embodiments, the searching for a matching user can be performed at the operating system level with or without the use of objects.

At block 411, it can be determined if the password provided by the user and the stored password for the matching known user match. In various embodiments, either one or both of the stored password or the password provided by the user may be modified, at block 407 and at block 409 respectively, before the comparison is performed at block 411 to determine a match. Modifications to passwords can include encryption, decryption, salting, hashing, etc.

If at block 411, the password provided by the user and the stored password of the known user does not match, then at block 413, the user is denied authentication and denied access. If at block 411, the password provided by the user and the stored password of the known user do match, at block 415, the user can be authenticated as a known user. Further access to resources can be restricted as discussed with respect to FIG. 5, FIG. 6A, FIG. 6B, and FIG. 7.

Authorization, Use Cases, and Qualifications

After authenticating the identity of the user, an access management system can determine which resources the user is authorized to access. For example, the user may have authorizations to read, write, and/or modify different resources.

In addition to managing the authorizations, the access management system can receive a use case selected by the user. The selected use case can be selected from among or compared to a plurality of available use cases. From among the resources that the user has authorizations for, it can be determined which resources the user is allowed to access for the purpose specified by the selected use case. Accordingly, the pool of authorized resources that are available to the user can be narrowed based at least in part on the selected use case.

In addition to using the selected use case, the access management system can determine if a user has sufficient qualifications to access a resource. In some examples, the access management system determines if a user has sufficient qualifications for a selected use case, and the user can be granted access to any resources linked to the selected use case. Qualification requirements can be specified per-resource and/or per use case. The required qualifications can be compared to the qualifications of the known user. Accordingly, the pool of authorized resources that are narrowed based on the selected use case can be further narrowed based at least in part on qualifications of the known user.

FIG. 5 shows an example block diagram 500 including object models for managing access to resources using authorizations, use cases, and qualifications. The block diagram includes an object model for a known user 309, an object model for a resource 501, an object model for a use case 503, an object model for a qualification 505, an object model for a tag 507, an object model for a link 509, and one or more services 313 for managing access to resources and/or auditing access to resources. The objects can be stored in a database, such as the database 307 described with respect to FIG. 3, and the services 313 can be executed by a computer system such as the access management system 308 described with respect to FIG. 3.

In FIG. 5, the known user object 309 can represent a user who may access various resources. The properties of the known user object 309 can include authentication information such as "Authen_Info." The authentication information can include a username, a stored or encrypted password, and/or other information used for authenticating credentials. The known user object 309 can also include a property such as "Author_Info" to indicate linked resource objects 501 that the known user has access to. For example, the authentication information can indicate linked resource objects 501 that represent resources that the known user is authorized to read from, write to, modify, or otherwise access. In some embodiments, an operating system, file management system, and/or other service (such as an access control list ("ACL") service) can manage authentication and authorizations, and the properties or links of the known user object 309 do not necessarily include authentication information or authorization information.

The known user object 309 can also have a property such as "Use_Cases" to indicate one or more linked use case objects 503 that represent purposes for which the user is allowed to access various resources. The known user object 309 can also have a property such as "Selected_Use" to indicate a selected use case object 503. The selected use case can be changed by the user, and the selected use case can be set for each user log-in session. The known user object 309 can also have a property such as "User_Quals" indicating links to one or more qualification objects 505 to represent qualifications of the known user.

The resource object 501 includes a property such as "Represented_Resource" specifying a computer resource being represented by the resource object 501. The represented resource can be, for example, a String data type that indicates a file, folder, directory, dataset, application, code repository, analysis, a hardware identifier, a name of a computer, a link, a uniform resource locator (URL), a server, a printer, etc. The represented resource can also be, for example, another class of object that specifies a particular computer resource. The resource object 501 can also include a property such as "Authorized Users" indicating linked known user objects 309 that represent users who have read, write, modify, or other authorizations for the represented resource. The resource object 501 can also have a property such as "Permitted_Uses" indicating one or more linked use case objects specifying purposes that the represented resource may be accessed for. The resource object 501 can also have a property such as "Resource_Specific_Quals" indicating linked qualification objects to represent qualifications to be satisfied in order to access the represented resource. In some embodiments, the resource object 501 may indicate a plurality of qualifications, any one of which may be satisfied to grant access. The resource object 501 may additionally or alternatively include a plurality of qualifications, all of which are to be satisfied for access. The resource object 501 can also have a property such as "Tags" indicating one or more linked tag objects specifying additional qualifications, use cases, or combinations of qualifications and use cases for accessing the represented resource.

The use case object 503 can be used to indicate allowed purposes for accessing resources and/or a purpose that a user has specified for accessing resources. Use case objects 503 that are linked to known user objects 309 can indicate available purposes that a user may select for accessing resources and/or indicate a selected purpose for accessing resources. Use case objects 503 can be linked to resource objects 501 to indicate purposes for which users may access the represented resource. Use case objects 503 include a property such as "Case_Specific_Qualifications" indicating linked qualifications objects 505 to represent qualifications required of users when a user accesses a resource for the purpose represented by the use case object 503. In some embodiments, the use case objects 503 can be linked to a plurality of qualification objects 505, any one of which may be satisfied to receive access. The use case objects 503 may additionally or alternatively be linked to a plurality of qualification objects 505, some or all of which are to be satisfied in order to receive access. Use case objects 503 can have a property such as "Tags" indicating linked tag objects 507 that may indicate one or more additional required qualifications for accessing a resource for the purpose represented by the use case object 503.

The qualification object 505 can be used to represent a type of qualification that is required for resource access and/or a qualification that a known user has obtained. The qualification object 505 can have a property such as "Type" for describing the type of qualification represented by the qualification object 505. Example types of qualifications include completing trainings, technical skills, title, licenses, approval from another user such as a data owner compliance owner to access data, etc. The qualification object 505 can have a property such as "Qualified_Users" indicating linked known user objects 309 that have obtained the type of qualification represented by the qualification object 505. A qualification object 505 that is linked to a use case object 503 or a resource object 501 can indicate a qualification that is required for the purpose or for accessing the represented resource, respectively. The qualification object 505 can have a property such as "How_To_Qualify" to provide instructions to users about how to obtain the qualification. The indication of how to obtain the qualification can be presented to users who are trying to access a resource that requires the type of qualification if the users have not obtained the type of qualification. For example, the indication of how to obtain the qualification can be a string, such as a prompt to "Complete a training program at this website" or "provide your authorization number." As other examples, the indication of how to obtain the qualification can be a different object, such as an object representing a web page or URL that a user should access, an object representing a different user to be contacted, etc.

The tag object 507 can be used to provide a convenient way to link one or more use cases and/or one or more qualifications. The tag can have a property such as "Label" to describe the purpose of the tag and/or the types of qualifications or use cases associated with the tag. The tag can also be linked to one or more qualification objects 505 (e.g., the "Required_Quals") and to one or more use case objects (e.g., the "Permitted_Uses"). When the tag object 507 is linked to a resource object 501, the resource object 501 can treat the use case objects 503 that are linked to the tag object 507 as use cases that are permitted for accessing a represented resource. When the tag object 507 is linked to a resource object 501, the resource object 501 can also treat the required qualifications of the tag object 507 as qualifications that are required for accessing the represented resource. When the tag object 507 is linked to a use case object 503, the use case object 503 can treat the required qualifications of the tag object 507 as case specific qualifications.

In various embodiments, the links between objects can be achieved in different ways. As one example, FIG. 5 shows a symmetrical link between known user objects 309 and resource objects 501 in that each known user object 309 can indicate linked resource objects 501 (e.g., via the Author_Info properties of the known user object 309) and in that each resource object 501 can indicate linked known user objects 309 who have the respective authorizations (e.g., via the Authorized_Users properties of the resource object 501). As another example, FIG. 5 shows a one directional link between a use case object 503 and a tag 507. The use case object 503 may be linked to one or more tag objects 507 (e.g., via the "Tags" property of the use case object 503), but the tag object 507 does not include a property indicating which use cases are linked to the tag. Symmetrical links provide redundant information but may sometimes facilitate searching. In various embodiments, any combination of the links shown in FIG. 5 could be implemented as asymmetrical or symmetrical links.

In some embodiments, the links implemented through properties of objects can be additionally or alternatively be implemented using a link 509. The link 509 can include a description about the type of link (e.g., the "Type_of_Link") being represented or established by the link 509. The link 509 can include a first linked object and a second linked object that are linked to each other. The first and second linked objects can include known user objects 509, resource objects 501, use case objects 503, qualification objects 505, and/or tag objects 507. For example, a link 509 can have a type of link that represents "Read authorized resources of a known user" or "Known users who have read authorization for this resource," the first linked object can be one linked user object 309, and the second linked object can include one or more resource objects 501. Other example types of links can indicate that:

a known user object 309 "has a qualification of" a qualification object 505;

a resource object 501 or a use case object 503 "requires the qualification of" a qualification object 505;

a use case object 503 is "selected by" a known user object 309;

a known user object "has a [read/write/modify/any/all] authorization for" a resource object 501;

a resource object 501 "may be accessed for purposes specified by" a use case object 503;

a resource object 501 "allows additional purposes" specified by use case objects 503 that are linked to a tag object 507;

a resource object 501 "requires additional qualifications" specified by qualification objects 505 linked to a tag objet 507;

a use case object 503 "requires additional qualifications" specified by qualification objects 505 linked to a tag object 507; or any other linked property or relationship discussed herein, including symmetric or asymmetric versions thereof.

Accordingly, in various embodiments, one, some, or all objects discussed herein can be linked by a link 509 instead of (or in addition to) having properties that specify linked objects. In various embodiments, one, some, or all objects discussed herein can be linked by a link 509 instead of (or in addition to) being linked through matching properties. In some embodiments, the link 509 can include additional (e.g., third, fourth, . . . , Nth) linked objects and indicate more complex multi-object relationships.

The service 313 can include an access service and/or an audit service. A computer system (such as the access management system 308 described with respect to FIG. 3) can use an access service to manage access by known users to represented resources. The access management system can also use an audit service to log the resource access (including access attempts) on a data storage device. The log can include times of access, an identity of the user attempting to access a resource, the resource being accessed, the use case for the access, and/or the qualifications for the user. An example flowchart for the access and audit services is discussed with respect to FIG. 6A and FIG. 6B.

It will be understood that various embodiments can implement the objects in different ways. For example, the "Permitted_Uses" of the resource object 501 is shown as one or more use case objects 503, but in some embodiments, the "Permitted_Uses" can be an array, list, or other data structure indicating one or more use case objects 503. The object models are not intended to depict necessary or an exhaustive list of properties. For example, in some embodiments, the resource object 501 can also include other properties such as links to known users who are authorized to modify a represented resource. As another example, user objects 309 may omit properties indicating which resource objects 501 the user object has authorizations for; instead, the authorizations (e.g., the "Auth_Users_Read and/or Auth_Users_Write" of a resource object 501 can be accessed to determine if a known user object 309 is authorized to access a represented resource.

Figure 6A:
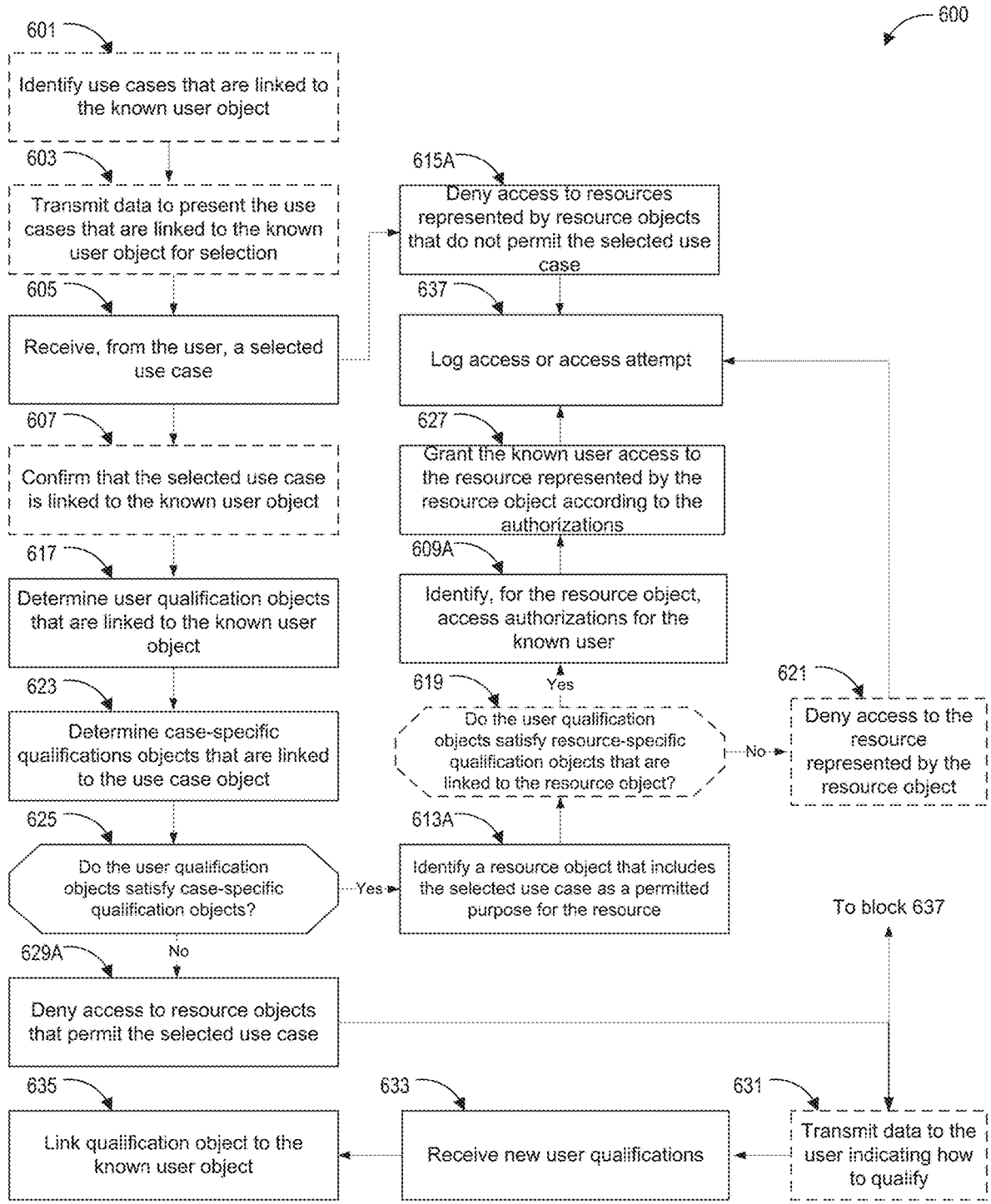
FIG. 6A shows a flowchart for an example access and audit service.
Figure 6B:
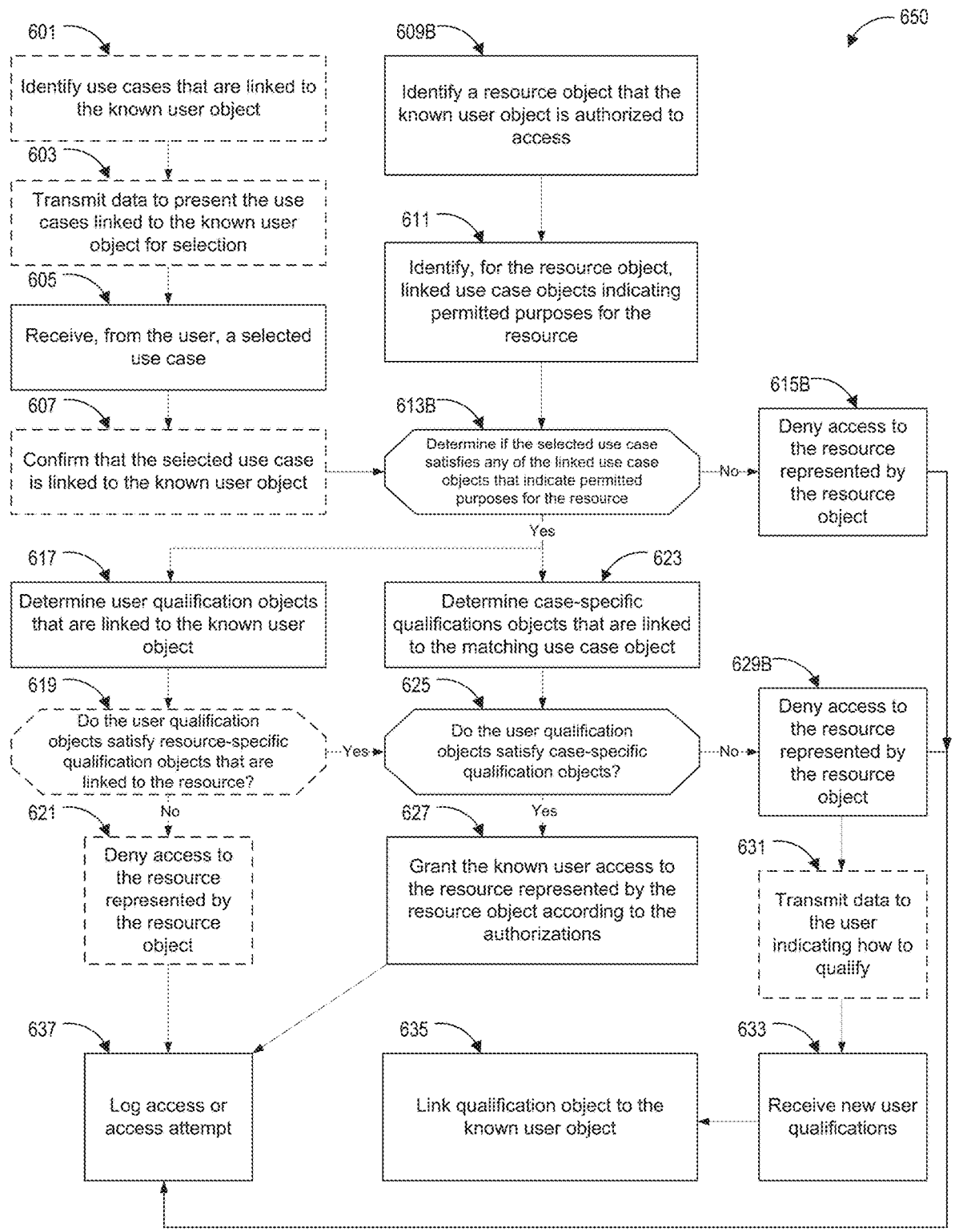
FIG. 6B shows a flowchart for an example access and audit service.

FIG. 6A shows a flowchart 600 for an example access and audit service. After a user is authenticated as a known user (such as described with respect to FIG. 4), access to resources can be managed and logged according to the flowchart 600. In some embodiments, an operating system, file management system, and/or other service can manage authentication and authorizations, and blocks relating to authentication and authorization can be skipped. FIG. 6A includes blocks that are the same and/or similar to blocks in FIG. 6B, and some of the blocks shown in FIG. 6B are arranged in a different order as compared to the blocks in FIG. 6A.

Blocks 601-607 and 615A relate to determining resource access based at least in part on use cases. Blocks 617-629A, 609A, and 613A relate to determining resource access based at least in part on qualifications. To provide examples, the detailed description of FIG. 6A may refer to portions shown in and discussed with respect to FIG. 5. In some embodiments, an operating system, file management system, and/or other service can manage authentication and authorizations, and blocks relating to authentication and authorization can be skipped.

At block 601, use cases that are linked to a known user object can be identified. As a first example, for a known user object 309, the linked Use_Cases can be identified. As another example, a plurality of use case objects 503 can be searched to determine which use case objects 503 include the known user object 309 as one of the Permitted_Users. As another example, a plurality of links 509 that include links between known user objects 309 and use case objects 503 can be examined to identify which of the use case objects 503 are linked to the known user object 309.

At block 603, data can be transmitted (such as to the computer system 301 shown in FIG. 3) to present, for the user to select, the use cases that are linked to the known user. In some embodiments, the use cases can be presented by displaying a description of the respective use cases and/or the purpose represented by the respective use cases.

At block 605, a selected use case can be received from the user. In response to the selection, at block 615A, the user can be denied access to any resources that do not include the user's selected use case as a permitted use case. Block 605 can also proceed to block 617.

At block 617, the qualifications of the known user can be determined. This can be performed, for example, by determining which qualification objects 505 are linked to the known user 309. The qualification objects 505 that are linked to the known user 309 may be collectively referred to as user qualification objects. Block 617 can proceed to block 623.

At block 623, qualifications specific to the selected use case can be determined. This can be performed, for example, by determining which qualification objects 505 are linked to (e.g., are included in the "Case_Specific_Quals" of) the selected use case object 503. The qualification objects 505 that are linked to the selected use case object 503 may be referred to as the case-specific qualification objects.

At block 625, it can be determined if qualifications of the known user satisfy or match the case-specific qualification objects. This can be performed, for example, by comparing case-specific qualification objects to the user qualification objects. The comparison can be performed, for example, as an object to object comparison or by comparing properties of the qualification objects (such as the Type). In some embodiments, the case-specific qualifications are satisfied if a user has at least one qualification that matches a case-specific qualification. In some embodiments, the case-specific qualifications can be satisfied if a user has all of the case-specific qualifications. If the user qualification objects do satisfy or match the case-specific qualification objects, then block 625 can proceed to block 613A. If the user qualification objects do not satisfy or match the case-specific qualification objects, this can indicate that the user does not have the qualifications to access the represented resource for the selected purpose, and block 625 can proceed to block 629A, where access to resource objects that permit the selected use case is denied. Block 629A can proceed to block 637 and to block 631.

At block 613A, a resource object that includes the selected use case as a permitted use case can be identified. This can also be performed, for example, by determining which resource objects 501 are linked to the selected use case object 503. This can be also performed, for example, by comparing the selected use case to the use case objects 503 that are linked to the resource object 501, and it can be determined whether or not the selected use case satisfies a use case that is permitted for accessing the resource represented by the resource object 501. A selected use case object 503 can be compared to use case objects 503 that are linked to the resource object 501, or a selected purpose can be compared to purposes of the use case objects 503 that are linked to the resource object 501. Block 613A can proceed to block 619 or to block 609A. It will be understood that block 613A, 619, 609A, and 627 can be performed for a plurality of resource objects 501 that permit access for the user's selected use case.

At block 619, for the resource identified at block 613A, it can be determined if the user qualifications objects satisfy any resource-specific qualification objects. This can be performed, for example, by determining if the user object 309 is linked to any of the qualification objects 505 that are linked to the resource object 501. This can also be performed, for example by comparing the qualifications of the known user to qualifications required for accessing the resource that is represented by the resource object 501. This can be performed, for example, by comparing qualification objects 505 that are linked to the resource object 501 to the user qualification objects. The comparison can be performed, for example, as an object to object comparison or by comparing properties of the qualification objects (such as the Type). If the user qualification objects do not satisfy or match the qualification objects linked to the resource, this can indicate that the user does not have the qualifications to access the represented resource, and block 619 can proceed to block 621, where access to the represented resource can be denied. If the user qualification objects do satisfy or match the qualification objects linked to the resource object 501, then block 619 can proceed to block 609A. To satisfy or match the qualification objects linked to the resource object 501, a user qualification object can be the same as, represent a same purpose as, or be linked to at least one of the qualification objects that are linked to the resource object 501. In some embodiments, the qualification objects linked to the resource object 501 may require that a plurality (not just any one) or all of the qualification objects that are linked to the resource object 501 be satisfied or matched. In some embodiments, a resource object 501 may not indicate any qualifications specifically required for access to the represented resource. Instead, the resource object 501 may rely on qualifications associated with the permitted use cases. Block 619 can sometimes be skipped.

At block 609A, the user's access authorizations can be determined for the resource object. The authorization can include a read, write, and/or modify authorization. Block 609B can proceed to block 627.

At block 627, the user can be granted access to the resource that is represented by the resource object in accordance with the user's authorizations for the resource object. Block 627 can proceed to block 637.

At block 637, accesses (including failed access attempts) can be logged for auditing. Block 637 can proceed after block 615A, block 621, block 629A, and/or block 627. The logged information can include, for example, one, all, or any combination of: a time of access, whether or not the access was successful, an identity of the user such as the username, the resource being accessed, the selected use case for the access (which can be indicated by the purpose of a use case), the qualifications for the user, the authorizations of the user, an outcome of block 613A, an outcome of block 619, an outcome of block 625, the required qualifications for accessing the resource, any reasons why access was denied, and other information.

At block 631, the computer system (such as the access management system 308 described with respect to FIG. 3) can transmit data (such as the "How_To_Qualify" of the qualification object 505 that was not matched or satisfied at block 625) to indicate how the user can obtain the qualifications for accessing the resource. For example, the data can indicate that approval is required from one or more other user(s) such as data owners, data protection officers, and/or data compliance officers. The data can indicate that a validation from another user is required to validate that a resources will be used for a selected use case. The data also can additionally or alternatively direct the user to a training website, instruct the user to upload a certificate or license, or require performance of other activity.

At block 633, new user qualifications can be received. The qualifications can be received, for example, if the user complies with the instructions transmitted at block 631. At block 635, a link between the known user object 309 and the qualification object 505 can be established in response to receiving the new user qualifications.

In various embodiments, the blocks shown in FIG. 6A can be performed in a different order and/or with additional prompts to the user. For example, block 625 can be performed after block 619. As another example, an authenticated user may inquire if the authenticated user has access to a resource. If the resource has at least one restriction, such as a use case requirement, then the computer system can prompt the user that the resource is restricted to certain use cases. The user can inquire whether any of those certain use cases are linked to the user. If the access management system does confirm such a link, then the user can select the use case for accessing the resource. The user can inquire whether the user has the qualifications and/or authorizations for the resource, and the computer system can check. If so, then the computer system can grant the user access to the resource. In some embodiments, one or more of the inquiries can automatically be performed by a computer system to determine which resources an authenticated resources a user can access, and the computer system can hide or not display any resources for which the user lacks proper use cases and/or qualifications for.

FIG. 6B shows a flowchart 650 for an example access and audit service. After a user is authenticated as a known user (such as described with respect to FIG. 4), access to resources can be managed and logged according to the flowchart 600. Blocks 601-615 relate to determining resource access based at least in part on use cases. Blocks 617-629 relate to determining resource access based at least in part on qualifications. To provide examples, the detailed description of FIG. 6B may refer to portions shown in and discussed with respect to FIG. 5. In some embodiments, an operating system, file management system, and/or other service can manage authentication and authorizations, and blocks relating to authentication and authorization can be skipped.

At block 601, use cases that are linked to a known user object can be identified. As a first example, for a known user object 309, the linked Use_Cases can be identified. As another example, a plurality of use case objects 503 can be searched to determine which use case objects 503 include the known user object 309 as one of the Permitted_ Users. As another example, a plurality of links 509 that include links between known user objects 309 and use case objects 503 can be examined to identify which of the use case objects 503 are linked to the known user object 309.

At block 603, data can be transmitted (such as to the computer system 301 shown in FIG. 3) to present, for the user to select, the use cases that are linked to the known user. In some embodiments, the use cases can be presented by displaying the purpose represented by the respective use cases.

At block 605, the user can select a use case. In some embodiments, the user may type in a purpose associated with a use case or otherwise provide a selection. In some embodiments, the user may select one of the purposes presented by the computer system to indicate the selected use case. Whether or not the user has the qualifications for the selected use case can be determined in later blocks.

At block 607, it can be confirmed that the selected use case is linked to the known user object 309. The presence of a link can indicate that the user is allowed to access at least one resource for the purpose specified by a use case object. In some embodiments, block 607 can be skipped if block 603 was performed.

At block 609B, a resource object 501 that the known user object 309 is authorized to access can be identified. The authorization can include a read, write, and/or modify authorization. It will be understood that the blocks 609B-637 can be performed for a plurality of resource objects 501 that the known user object has access authorizations for.

At block 611, use case objects 503 that are linked to the resource object 501 identified in block 609B can be identified. The use case objects 503 can indicate purposes for which users may access a resource that is represented by the resource object 501.

At block 613B, the selected use case can be compared to the use case objects 503 that are linked to the resource object 501, and it can be determined whether or not the selected use case satisfies a purpose for which access to the resource represented by the resource object 501 is allowed. A selected use case object 503 can be compared to use case objects 503 that are linked to the resource object 501, or a selected purpose can be compared to purposes of the use case objects 503 that are linked to the resource object 501. If the selected select use case does not satisfy or match a purpose for which the represented resource may be accessed, then block 613B can proceed to block 615B, and the user can be denied access to the resource that is represented by the resource object 501. If the selected use case does match or satisfy a purpose for which the represented resource may be accessed, then block 613B can proceed to block 617 and block 623.

At block 617, the qualifications of the known user can be determined. This can be performed, for example, by determining which qualification objects 505 are linked to the known user 309. The qualification objects 505 that are linked to the known user 309 may be collectively referred to as user qualification objects. Block 617 can proceed to block 619 or to block 625.

At block 619, the qualifications of the known user can be compared to qualifications required for accessing the resource that is represented by the resource object 501. This can be performed, for example, by comparing qualification objects 505 that are linked to the resource object 501 to the user qualification objects. The comparison can be performed, for example, as an object to object comparison or by comparing properties of the qualification objects (such as the Type). If the user qualification objects do not satisfy or match the qualification objects linked to the resource, this can indicate that the user does not have the qualifications to access the represented resource, and block 619 can proceed to block 621, where access to the represented resource can be denied. If the user qualification objects do satisfy or match the qualification objects linked to the resource object 501, then block 619 can proceed to block 625. In some embodiments, a resource object 501 may not indicate any qualifications specifically required for access to the represented resource. Instead, the resource object 501 may rely on qualifications associated with the permitted use cases. Block 619 can sometimes be skipped.

At block 623, qualifications specific to the selected use case can be determined. This can be performed, for example, by determining which qualification objects 505 are linked to (e.g., are included in the "Case_ Specific_Quals" of) the selected use case object 503. The qualification objects 505 that are linked to the selected use case object 503 may be referred to as the case-specific qualification objects.

At block 625, it can be determined if qualifications of the known user satisfy or match the case-specific qualification objects. This can be performed, for example, by comparing case-specific qualification objects to the user qualification objects. The comparison can be performed, for example, as an object to object comparison or by comparing properties of the qualification objects (such as the Type). If the user qualification objects do satisfy or match the case-specific qualification objects, then block 625 can proceed to block 627, where the known user is granted access to the resource represented by the resource object 501 according to the authorization for the user. If the user qualification objects do not satisfy or match the case-specific qualification objects, this can indicate that the user does not have the qualifications to access the represented resource for the selected purpose, and block 625 can proceed to block 629B.

At block 629B, the user can be denied access to the resource that is represented by the resource object. Block 629B can proceed to block 631.

At block 631, the computer system (such as the access management system 308 described with respect to FIG. 3) can transmit data (such as the "How_To_Qualify" of the qualification object 505 that was not matched or satisfied at block 625) to indicate how the user can obtain the qualifications for accessing the resource. For example, the data can direct the user to a training website, instruct the user to upload a certificate or license, or require performance of other activity.

At block 633, new user qualifications can be received. The qualifications can be received, for example, if the user complies with the instructions transmitted at block 631. At block 635, a link between the known user object 309 and the qualification object 505 can be established in response to receiving the new user qualifications.

At block 637, accesses (including failed access attempts) can be logged for auditing. Block 637 can proceed after block 615B, block 621, block 629B, and/or block 627. The logged information can include, for example, one, all, or any combination of: a time of access, whether or not the access was successful, an identity of the user such as the username, the resource being accessed, the selected use case for the access (which can be indicated by the purpose of a use case), the qualifications for the user, the authorizations of the user, an outcome of block 613B, an outcome of block 619, an outcome of block 625, the required qualifications for accessing the resource, any reasons why access was denied, and other information.

As shown, FIG. 6A and FIG. 6B show many similar blocks performed in different orders. In various systems, there can be efficiency gains in performing the blocks according to one order or the other. For example, in FIG. 6A, there can be fewer resource objects that can be identified in block 613A. As another example, in FIG. 6B, block 619 can be performed for fewer resource objects.

As another example, a user can interact with an authorization service to determine if the user is authorized to access a resource. The authorization service can determine that the user is authorized to access the resource, but that the resource is restricted to purposes specified by one or more use cases. An access management system can determine if the user is allowed to select any use cases permitted for accessing that resource. If so, then the access management system can determine if the user is qualified for at least one use case that is permitted for accessing that resource. If so, then, the access management system can determine if the user has selected that use case as the selected use case. If so, then the user can be allowed to access the resource according to the authorizations.

FIG. 7 shows example models for instances of objects related to an instance 701 of a known user object. The example instance 701 of a known user is named "Bob" to reflect its username property. FIG. 7 also includes an instance "Tax_Docs" 703 of a resource object, an instance "Resumes" 507 of a resource object, an example instance "Finance" 707 of a use case object, an example instance "Hiring" 709 of a use case object, an example instance "CPA" 711 of a qualification object, an example instance "DiversityTraining" of a qualification object, an example instance "Confidential" 715 of a tag object, and an example instance "SecretLvl2" 717 of a qualification object. An instance Name of an object may be discussed herein by reference to the Name.

Arrows are used in FIG. 7 to indicate links. In various embodiments, the links can be implemented as asymmetrical links or as symmetrical links. In various embodiments, the links can be implemented with links 509 discussed with respect to FIG. 5. Link can be implemented through matching properties of objects.

A user may attempt to access resources of a computer system by providing a username and password. The provided username can be compared to the username of Bob 701, and the password can be (e.g., after encryption and/or decoding) compared to the stored password for Bob 701, such as described with respect to FIG. 4. By providing the correct username and password, the user can be authenticated as the known user Bob 701.

The Tax_Docs resource 703 represents the file directory "Dir:\Taxes." The properties of Bob 701 indicate that Bob 701 has read authorizations for the Tax_Docs resource, and the link between Bob 701 and the Tax_Docs resource 703 is represented as an arrow between Bob 701 and Tax_Docs 703.

The user has selected that the use case is for finance, and the instance Bob 701 indicates that the Selected_Use object is the use case Finance 707. The use case Finance 707 is one of the two use case objects (the other being the use case Hiring 709) that are available to the instance Bob 701. Arrows are used to show links between Bob 701 and the use cases 707, 709 that are available to Bob. An additional arrow is used to show a link between Bob 701 and the selected use case Finance 707.

To access the resource (the directory Dir:\Taxes) that is represented by Tax_Docs 703, a known user is required to satisfy the Permitted_Uses qualifications specified by the instance Tax_Docs 703 and satisfy any criteria (e.g., use cases and/or qualifications) associated with the Tags (the "Confidential" tag) specified by the instance Tax_Docs 703.

The Permitted_Uses of the instance Tax_Docs 703 include Finance 707 and Legal use cases, indicating that the directory Dir:\Taxes may be accessed for financial or legal related purposes. The instance for a legal use case is not shown in FIG. 7. Tax_Docs resource 703 is linked to the use case Finance 707 (e.g., as shown by the respective arrow) to indicate that users may access the directory for finance related purposes. Bob 701 is also linked to the use case Finance 707 twice: once because the Finance 707 use case is available to Bob, and a second time because Bob 701 has selected the Finance use case 707. Bob's 701 selected Finance use case 707 matches one of the permitted use cases specified by the Tax_Docs 703, but Bob must also satisfy the qualifications for the Finance use case 707 and qualifications for the Confidential tag 715.

Finance 707 is linked to the qualification instance CPA 711, indicating that a CPA qualification is required when accessing resources for finance related purposes. Bob 701 is also linked to CPA 711, indicating that Bob has the CPA qualification that is required for accessing resources for finance related purposes.

The Confidential 715 tag that is linked to Tax_Docs 703 indicates additional required qualifications: either a SecretLvl1 qualification (instance not shown) or a SecretLvl2 qualification 717. The link between the Confidential tag 715 and the SecretLvl2 qualification is indicated with an arrow. Bob's 701 User_Quals include SecretLvl2, and an arrow indicates the link between Bob 701 and SecretLvl2 to indicate that Bob 701 has that qualification.

Because Bob's 701 selected use case matches one of the permitted uses cases for accessing the represented resource of Tax_Docs 703, Bob 701 is linked to the CPA qualification 711 required for the Finance use case 707, and Bob 701 is linked to the SecretLvl2 qualification 717 that is linked to the Confidential tag 715 that is linked to Tax_Docs 703, Bob may read files in the resource Dir:\Taxes as allowed by the Tax_Docs authorizations.

Bob 701 does not have access to the Resume resources 705 shown in FIG. 7. Bob's selected Finance use case 707 does not match the Hiring use case 709 that is required to access "Folder:\Resumes," even though Bob may have both read and write authorizations for the Resume resource 705. Accordingly, when a user authenticated as the known user Bob 701 accesses resources of a computer system, the resource "Dir:\Taxes" may be displayed and made read-accessible, but the resource "Folder:\Resumes" may not appear or may appear but be unavailable for accessing.

To access the resource "Folder:\Resumes," Bob 701 may change the selected use from Finance 707 to Hiring 709. This change can cause the Tax_Docs resource 703 to no longer be accessible to Bob 701. However, in addition to selecting the correct Hiring use case 709, Bob 701 must also satisfy any required qualifications of the Resume resource 705, which can include qualifications linked to the Hiring use case 709, qualifications linked to the Confidential tag 715 that is linked to the Hiring use case 709, and qualification linked to the Resumes resource 705.

The Hiring use case 709 does not include any qualifications specific to hiring. However, the Hiring use case 709 is linked to the Confidential tag 715, which requires either a SecretLvl1 qualification or SecretLvl2 qualification 717. As explained above, Bob 701 is linked to and has the SecretLvl2 qualification.

The Resume resource 705 also requires that users have the DiversityTraining qualification 713. However, Bob's 701 user qualifications do not include DiversityTraining 713, and Bob 701 is not linked to DiversityTraining 713. Accordingly, if a user authenticated as Bob 701 selected a Hiring use case 709, the resource "Folder:\Resumes" can, in some embodiments, be shown but made inaccessible. Instead of receiving access to the "Folder:\Resumes," the user may receive a message with instructions to obtain the DiversityTraining qualification 713: "Complete Diversity Training Program at protocol://address.domain."

Whenever the user authenticated as Bob 701 access (and/or fails to access) any of the resources represented by instances 703 or 705, an auditing service can log the time of the access, that Bob was the user, the represented resource accessed, the selected use case, Bob's authorizations, and Bob's qualifications related to the access. If Bob was denied access, then the reason for the denial, whether lack of authentication, lack of authorization, wrong use case, and/or insufficient qualifications can be logged.

Additional Example Uses

Using the technology and framework described herein, managing access to resources can be performed much faster. For example, tags such as "Confidential" can be applied to various resources that are confidential. It may be desirable to, at some point, change the access from what is shown in FIG. 7 (e.g., either a SecretLvl1 qualification or a SecretLvl2 qualification) such that only users with a SecretLvl2 qualification or a SecretLvl3 qualification can access confidential resources. Without the framework described herein, an administrator having only authorization tools at his/her disposal will need to manually review every resource on the computer system to determine which resources are confidential, and for every confidential resource, ask each of the authorized users if they had only the SecretLvl1 qualification and, if so, edit the authorizations to remove access for those users, and ask all users if they have SecretLvl3 qualifications and then manually edit the authorizations to add all of those users. Using the framework described herein where confidential files are tagged as such, an administrator can achieve the same result by removing a link between the confidential tag and "SecretLvl1" and adding a link between the confidential tag and "SecretLvl3." Accordingly, tags can be applied to various resource and/or use cases and stored. Whenever a categorical change is to be made, the linked use cases and/or qualifications associated with the tag can be changed instead of re-identifying every resource and/or use case and then manually editing authorizations for every user of a system.

User access can also be determined and managed based on purposes for why resources might be appropriately accessed and what qualifications groups of users should have when accessing resources for those purposes. An administrator may know, for example, that CPA's should be accessing tax documents but not personally know which of thousands or millions of users on a network have CPA degrees. Instead of asking each of the users whether or not they have a CPA degree and then manually editing the permissions of each tax document to specify which thousands out of the millions of users have authorizations, the administrator can create a CPA qualification object and direct users to upload proof of their CPA qualifications through a website to obtain access.

The use cases can be used to prevent breaches of privacy. There are times when users may be authorized to access resources, but the user should only access the resources for certain purposes. For example, a CEO of a company may have full authorization to resources that are files that include demographic information about his employees. The CEO can specify a first use case, such as "Managing Employee Pay," and the files including demographic information can be made inaccessible to the CEO so that the files are not inadvertently accessed because pay should not be based on demographic backgrounds. When the CEO is instead working on diversity initiatives, the CEO can specify a different use case, such as "Diversity Initiative," and the CEO can be given access to the demographic information about the employees. This is different from a static authorization framework that does not implement use cases—either the CEO would have access to the files including demographic information, or the CEO would not. Without the framework described herein, an administrator could not achieve the same result by manually changing resource authorizations—the administrator could not change the resource authorizations for thousands or millions of resources at the same frequency that any of thousands or millions of users may change use cases for accessing resources.

Under the framework described herein, the reasons why individuals are accessing resources can be logged, and the accesses can be audited. Furthermore, the qualifications of the users who access the resources can also be audited to make sure that only qualified users are accessing resources.

In some embodiments, it may be realized that new qualifications can be required. For example, new contractual duties can be imposed based on customer demands, new laws may be passed to institute different requirements, new policies or rules may be created, and it can be desirable to ensure that any new duty/law/policy/rule is followed by creating a new qualification object and linking the new qualification object to a resource, use case, and/or tag. Some users of a system may already satisfy the new qualification and have access to the resource. A notice can be pushed to users who do not yet satisfy the new qualification to instruct those users about how to satisfy the new qualification. In some embodiments, a database or profile can be used to track which users have which qualifications.

In some embodiments, there can be hierarchies of qualifications. Some qualifications (such as a high level clearance) may automatically grant lower level qualifications. In some embodiments, hierarchies of resources can have different qualifications, and users can be required to satisfy qualifications associated with one level of resource in the hierarchy to gain access to the next level of resources in the hierarchy.

In some embodiments, the framework can be managed by administrators. The administrators can add or approve use cases, qualifications, tags, and resources, changes thereto, and/or links thereto. Managers may add or approve users for a limited set of resources and/or approve access requests from users for the limited set of resources. Managers may also add or approve users for a limited set of use cases and/or approve access requests from users for the limited set of use cases. Users can send requests for access to resources and/or use cases, and users can gain qualifications by performing actions described by the qualifications objects.

An interface can be provided to filter the audit logs discussed herein. The filters can provide for searching and/or generating formatted reports for specific users, resources, qualifications, use cases, times, successful or unsuccessful accesses, or based on any other logged data. The reports can also include visualizations of the data such as graphs, histograms, charts, and the like.

Additional Implementation Details and Embodiments

In an implementation the access management system 308 (or one or more aspects of the access management system 308) may comprise, or be implemented in, a "virtual computing environment". As used herein, the term "virtual computing environment" should be construed broadly to include, for example, computer readable program instructions executed by one or more processors (e.g., as described in the example of FIG. 7) to implement one or more aspects of the modules and/or functionality described herein. Further, in this implementation, one or more modules/engines/etc. of the access management system 308 may be understood as comprising one or more rules engines of the virtual computing environment that, in response to inputs received by the virtual computing environment, execute rules and/or other program instructions to modify operation of the virtual computing environment. For example, a request received from the user computing device 301 may be understood as modifying operation of the virtual computing environment to cause the request access to a resource from the access management system 308. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the access management system 308. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the access management system 308 as a virtual computing environment may advantageously enable executing different aspects or modules of the system on different computing devices or processors, which may increase the scalability of the system. Implementing one or more aspects of the access management system 308 as a virtual computing environment may further advantageously enable sandboxing various aspects, data, or modules of the system from one another, which may increase security of the system by preventing, e.g., malicious intrusion into the system from spreading. Implementing one or more aspects of the access management system 308 as a virtual computing environment may further advantageously enable parallel execution of various aspects or modules of the system, which may increase the scalability of the system. Implementing one or more aspects of the access management system 308 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
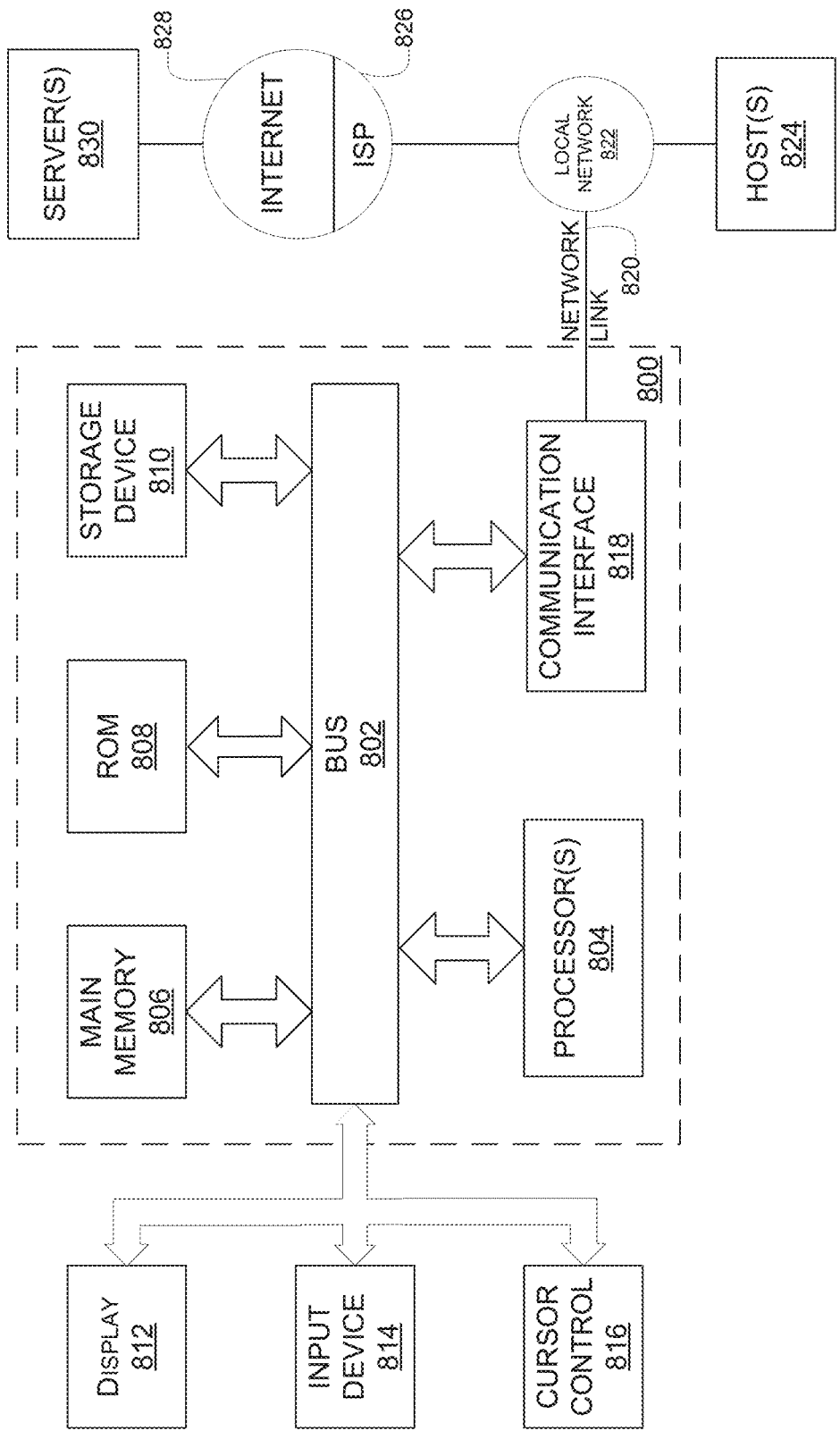
FIG. 8 shows a block diagram that illustrates a computer system upon which various embodiments may be implemented.

For example, FIG. 8 shows a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method of managing access to computer resources, the method comprising:
   by one or more processors configured to execute computer instructions:
   authenticating a first entity based on authentication credentials provided by the first entity;

after authenticating the first entity, receiving, from the first entity, a selection of a first purpose, wherein the first purpose is indicated by a first use case object;

in response to receiving the selection of the first purpose from the first entity:
  determining a first qualification object that is linked to the first use case object;
  determining that qualifications of the first entity satisfy a first qualification of the first qualification object; and
  determining a plurality of computer resources associated with the first use case object; and in response to receiving the selection of the first purpose and determining that the qualifications of the first entity satisfy the first qualification, providing the first entity with access to the first plurality of computer resources associated with the first use case object, wherein access to the first plurality of computer resources is granted to the first entity only after receiving the selection of the first purpose and determining that the qualifications of the first entity satisfy the first qualification of the first qualification object that is linked to the first use case object.

2. The computer-implemented method of claim 1, wherein the first qualification is one of a plurality of qualifications of a plurality of qualification objects linked to the first use case object, any one of which may be satisfied by the qualifications of the first entity to provide the first entity with access to the first plurality of computer resources.

3. The computer-implemented method of claim 1 further comprising:
by the one or more processors configured to execute the computer instructions:
  receiving, from a second entity, a selection of the first purpose;
  determining a second qualification object that is linked to the first use case object, wherein the second qualification object is different from the first qualification object;
  determining that qualifications of the second entity satisfy a second qualification of the second qualification object; and
  in response to receiving the selection of the first purpose and determining that the qualifications of the second entity satisfy the second qualification, providing the second entity with access to the first plurality of computer resources associated with the first use case object.

4. The computer-implemented method of claim 1 further comprising:
by the one or more processors configured to execute the computer instructions:
  receiving, from a second entity, a selection of the first purpose;
  determining that qualifications of the second entity do not satisfy the first qualification; and
  in response to determining that the qualifications of the second entity do not satisfy the first qualification, linking the second entity to an option for obtaining a qualification that will satisfy the first qualification.

5. The computer-implemented method of claim 4 further comprising:
by the one or more processors configured to execute the computer instructions:
  receiving an indication that the second entity obtained the first qualification; and in response to determining that the qualifications of the second entity do satisfy the first qualification, providing the second entity with access to the first plurality of computer resources associated with the first use case object.

6. The computer-implemented method of claim 1 further comprising:
by the one or more processors configured to execute the computer instructions:
  receiving, from a second entity, a selection of a second purpose, wherein the second purpose is indicated by a second use case object;
  determining a second qualification object that is linked to the second use case object, wherein the second qualification object is different from the first qualification object;
  determining a third qualification object that is linked to the second use case object, wherein the third qualification object is different from the first qualification object;
  determining that qualifications of the second entity satisfy at least one of: (i) a second qualification of the second qualification object, or (ii) a third qualification of the third qualification object; and
  in response to receiving the selection of the second purpose and determining that the qualifications of the second entity satisfy at least one of the second qualification or the third qualification, providing the second entity with access to a second plurality of computer resources associated with the second use case object.

7. The computer-implemented method of claim 1 further comprising:
by the one or more processors configured to execute the computer instructions:
  receiving, from a second entity, a selection of a second purpose, wherein the second purpose is indicated by a second use case object;
  determining a second qualification object that is linked to the second use case object, wherein the second qualification object is different from the first qualification object;
  determining a third qualification object that is linked to the second use case object, wherein the third qualification object is different from the first qualification object;
  determining that qualifications of the second entity satisfy both of: (i) a second qualification of the second qualification object, and (ii) a third qualification of the third qualification object; and
  in response to receiving the selection of the second purpose and determining that the qualifications of the second entity satisfy both of the second qualification and the third qualification, providing the second entity with access to a second plurality of computer resources associated with the second use case object.

8. The computer-implemented method of claim 1 further comprising:
by the one or more processors configured to execute the computer instructions:
  updating the first qualification of the first qualification object, wherein for subsequent access attempts involving the first qualification object, entities' qualifications must satisfy the updated first qualification.

9. The computer-implemented method of claim 1, wherein the first plurality of computer resources include at least one of: a file, a folder, a database, a memory, a processor, a drive, a storage device, a computer, a laptop, or a phone.

10. The computer-implemented method of claim 1 further comprising:
by the one or more processors configured to execute the computer instructions:
logging, in an audit log on one or more computer readable storage devices, an entry for an access to a first computer resource, of the first plurality of computer resources, by the first entity, wherein the entry includes at least two of:
a time stamp for the access,
an identity of the first entity,
an identity of the first computer resource,
the first purpose indicated by first use case object,
the qualifications of the first entity, or
qualifications required for accessing the first computer resource, the qualifications including the first qualification.

11. A computer system for managing access to computer resources, the computer system comprising:
one or more computer readable storage devices storing a plurality of computer readable instructions; and
one or more processors configured to execute the plurality of computer readable instructions to cause the computer system to perform operations comprising:
authenticating a first entity based on authentication credentials provided by the first entity;
after authenticating the first entity, receiving, from the first entity, a selection of a first purpose, wherein the first purpose is indicated by a first use case object;
in response to receiving the selection of the first purpose from the first entity:
determining a first qualification object that is linked to the first use case object;
determining that qualifications of the first entity satisfy a first qualification of the first qualification object; and
determining a plurality of computer resources associated with the first use case object; and
in response to receiving the selection of the first purpose and determining that the qualifications of the first entity satisfy the first qualification, providing the first entity with access to a first plurality of computer resources associated with the first use case object,
wherein access to the first plurality of computer resources is granted to the first entity only after receiving the selection of the first purpose and determining that the qualifications of the first entity satisfy the first qualification of the first qualification object that is linked to the first use case object.

12. The computer system of claim 11, wherein the first qualification is one of a plurality of qualifications of a plurality of qualification objects linked to the first use case object, any one of which may be satisfied by the qualifications of the first entity to provide the first entity with access to the first plurality of computer resources.

13. The computer system of claim 11, wherein the one or more processors are configured to execute the plurality of computer readable instructions to cause the computer system to perform operations further comprising:
receiving, from a second entity, a selection of the first purpose;
determining a second qualification object that is linked to the first use case object, wherein the second qualification object is different from the first qualification object;
determining that qualifications of the second entity satisfy a second qualification of the second qualification object; and
in response to receiving the selection of the first purpose and determining that the qualifications of the second entity satisfy the second qualification, providing the second entity with access to the first plurality of computer resources associated with the first use case object.

14. The computer system of claim 11, wherein the one or more processors are configured to execute the plurality of computer readable instructions to cause the computer system to perform operations further comprising:
receiving, from a second entity, a selection of the first purpose;
determining that qualifications of the second entity do not satisfy the first qualification; and
in response to determining that the qualifications of the second entity do not satisfy the first qualification, linking the second entity to an option for obtaining a qualification that will satisfy the first qualification.

15. The computer system of claim 14, wherein the one or more processors are configured to execute the plurality of computer readable instructions to cause the computer system to perform operations further comprising:
receiving an indication that the second entity obtained the first qualification; and
in response to determining that the qualifications of the second entity do satisfy the first qualification, providing the second entity with access to the first plurality of computer resources associated with the first use case object.

16. The computer system of claim 11, wherein the one or more processors are configured to execute the plurality of computer readable instructions to cause the computer system to perform operations further comprising:
receiving, from a second entity, a selection of a second purpose, wherein the second purpose is indicated by a second use case object;
determining a second qualification object that is linked to the second use case object, wherein the second qualification object is different from the first qualification object;
determining a third qualification object that is linked to the second use case object, wherein the third qualification object is different from the first qualification object;
determining that qualifications of the second [[user ]]entity satisfy at least one of: (i) a second qualification of the second qualification object, or (ii) a third qualification of the third qualification object; and
in response to receiving the selection of the second purpose and determining that the qualifications of the second entity satisfy at least one of the second qualification or the third qualification, providing the second entity with access to a second plurality of computer resources associated with the second use case object.

17. The computer system of claim 11, wherein the one or more processors are configured to execute the plurality of computer readable instructions to cause the computer system to perform operations further comprising:
receiving, from a second entity, a selection of a second purpose, wherein the second purpose is indicated by a second use case object;

determining a second qualification object that is linked to the second use case object, wherein the second qualification object is different from the first qualification object;

determining a third qualification object that is linked to the second use case object, wherein the third qualification object is different from the first qualification object;

determining that qualifications of the second entity satisfy both of: (i) a second qualification of the second qualification object, and (ii) a third qualification of the third qualification object; and in response to receiving the selection of the second purpose and determining that the qualifications of the second entity satisfy both of the second qualification and the third qualification, providing the second entity with access to a second plurality of computer resources associated with the second use case object.

18. The computer system of claim 11, wherein the one or more processors are configured to execute the plurality of computer readable instructions to cause the computer system to perform operations further comprising:

updating the first qualification of the first qualification object, wherein for subsequent access attempts involving the first qualification object, entities' qualifications must satisfy the updated first qualification.

19. The computer system of claim 11, wherein the first plurality of computer resources include at least one of: a file, a folder, a database, a memory, a processor, a drive, a storage device, a computer, a laptop, or a phone.

20. The computer system of claim 11, wherein the one or more processors are configured to execute the plurality of computer readable instructions to cause the computer system to perform operations further comprising:

logging, in an audit log on the one or more computer readable storage devices, an entry for an access to a first computer resource, of the first plurality of computer resources, by the first entity, wherein the entry includes at least two of:

a time stamp for the access, an identity of the first entity, an identity of the first computer resource, the first purpose indicated by first use case object, the qualifications of the first entity, or qualifications required for accessing the first computer resource, the qualifications including the first qualification.

* * * * *

UNITED STATES PATENT AND TRADEMARK OFFICE
CERTIFICATE OF CORRECTION

| | | |
|---|---|---|
| PATENT NO. | : 11,914,687 B2 | Page 1 of 1 |
| APPLICATION NO. | : 17/092699 | |
| DATED | : February 27, 2024 | |
| INVENTOR(S) | : Babak Siavoshy | |

It is certified that error appears in the above-identified patent and that said Letters Patent is hereby corrected as shown below:

In the Claims

In Column 36, Claim 16, Line 51, after "second" delete "[[user]]".

Signed and Sealed this
Fifteenth Day of October, 2024

Katherine Kelly Vidal
*Director of the United States Patent and Trademark Office*